(12) United States Patent
Nabae

(10) Patent No.: US 7,551,634 B2
(45) Date of Patent: Jun. 23, 2009

(54) COMMUNICATION NETWORK SYSTEM

(75) Inventor: Takehiro Nabae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 685 days.

(21) Appl. No.: 11/024,418

(22) Filed: Dec. 30, 2004

(65) Prior Publication Data
US 2005/0122981 A1    Jun. 9, 2005

Related U.S. Application Data

(63) Continuation of application No. PCT/JP02/11779, filed on Nov. 12, 2002.

(51) Int. Cl.
*H04L 12/28* (2006.01)

(52) U.S. Cl. .................. 370/408; 370/60; 370/401; 370/403; 370/406

(58) Field of Classification Search .............. 370/60, 370/60.1, 219, 392–394, 401–408, 466
See application file for complete search history.

(56) References Cited

U.S. PATENT DOCUMENTS

| | | | | |
|---|---|---|---|---|
| 5,251,205 A | * | 10/1993 | Callon et al. ................. | 370/392 |
| 5,835,710 A | * | 11/1998 | Nagami et al. .............. | 709/250 |
| 5,917,820 A | * | 6/1999 | Rekhter ...................... | 370/392 |
| 6,201,810 B1 | * | 3/2001 | Masuda et al. ......... | 370/395.32 |
| 6,269,099 B1 | * | 7/2001 | Borella et al. ............... | 370/389 |
| 6,343,322 B2 | * | 1/2002 | Nagami et al. .............. | 709/227 |
| 6,501,760 B1 | * | 12/2002 | Ohba et al. ............ | 370/395.42 |
| 6,512,745 B1 | * | 1/2003 | Abe et al. .................... | 370/232 |
| 6,609,316 B2 | * | 8/2003 | Ohba et al. ............ | 370/395.42 |
| 6,678,474 B1 | * | 1/2004 | Masuda et al. ................. | 398/75 |
| 6,711,152 B1 | * | 3/2004 | Kalmanek et al. ........... | 370/351 |
| 6,744,734 B1 | * | 6/2004 | Iliadis et al. ............. | 370/238.1 |

(Continued)

FOREIGN PATENT DOCUMENTS

EP    1 104 963    6/2001

(Continued)

OTHER PUBLICATIONS

Norito Fujita et al., "Kaiso-ka o Mochiita Scalable na IP-Qos Seigyo System", The Institute of Electronics, Information and Communication Engineers Gijutsu Kenkyu Hokoku, SSE99-125, Dec. 17, 1999, Section 2, 1-2.2.

Primary Examiner—Edan Orgad
Assistant Examiner—Andrew C Lee
(74) Attorney, Agent, or Firm—Staas & Halsey LLP

(57) ABSTRACT

A communication network system includes: a plurality of lower hierarchy networks, each having a plurality of first relay apparatuses; and an intermediate hierarchy network having a plurality of second relay apparatuses for connecting the plurality of lower hierarchy networks via the second relay apparatuses at the edge position line-connected to the first relay apparatuses at the edge position. Each of the first relay apparatuses has a first routing table that holds information limited to routing information corresponding to the first relay apparatus and routing information on at least one of the first relay apparatuses and the second relay apparatuses in the edge positions that come into an adjacent state. Each of the second relay apparatuses has a second routing table that holds information including routing information on at least one of the second relay apparatuses and the first relay apparatuses in the edge positions that come into an adjacent state.

38 Claims, 37 Drawing Sheets

U.S. PATENT DOCUMENTS

| | | | |
|---|---|---|---|
| 6,944,675 B2 * | 9/2005 | Fujita | 709/240 |
| 6,954,790 B2 * | 10/2005 | Forslow | 709/227 |
| 7,215,644 B2 * | 5/2007 | Wu et al. | 370/248 |
| 7,272,648 B2 * | 9/2007 | Kawasaki et al. | 709/224 |
| 7,330,435 B2 * | 2/2008 | Guerin et al. | 370/238 |
| 7,379,454 B2 * | 5/2008 | Ogasawara et al. | 370/389 |
| 2001/0032272 A1 | 10/2001 | Fujita | |
| 2002/0023065 A1 * | 2/2002 | Frelechoux et al. | 706/21 |
| 2002/0051449 A1 | 5/2002 | Iwata | |
| 2003/0026260 A1 * | 2/2003 | Ogasawara et al. | 370/392 |
| 2003/0046390 A1 * | 3/2003 | Ball et al. | 709/224 |
| 2003/0152092 A1 * | 8/2003 | Lu | 370/408 |
| 2004/0017783 A1 * | 1/2004 | Szentesi et al. | 370/256 |
| 2004/0047353 A1 * | 3/2004 | Umayabashi et al. | 370/395.63 |
| 2004/0213233 A1 * | 10/2004 | Hong et al. | 370/392 |

FOREIGN PATENT DOCUMENTS

| | | |
|---|---|---|
| JP | 5-3492 | 1/1993 |
| JP | 7-66835 | 3/1995 |
| JP | 9-107377 | 4/1997 |
| JP | 11-340995 | 12/1999 |
| JP | 2000-31978 | 1/2000 |
| JP | 2002-252635 | 9/2002 |

* cited by examiner

NNS COMMUNICATION NETWORK SYSTEM

FIG. 13

112 SLIM ROUTING TABLE OF LRT15

| DESTINATION (NETWORK) | ROUTING DESTINATION |
|---|---|
| N 1 5 | OWN ROUTER |
| N 1 6 | LOCAL ROUTER 16 |
| OTHERS | LOCAL ROUTER 14 |

← ROUTE TO AREA ROUTER

FIG. 14

112 SLIM ROUTING TABLE OF LRT14

| DESTINATION (NETWORK) | ROUTING DESTINATION |
|---|---|
| N 1 4 | OWN ROUTER |
| N 1 3 | LOCAL ROUTER 13 |
| N 1 5 | LOCAL ROUTER 15 |
| OTHERS | AREA ROUTER 12 |

← ROUTE TO AREA ROUTER

NNS COMMUNICATION NETWORK SYSTEM

FIG. 16

112 SLIM ROUTING TABLE OF LRT14

| DESTINATION (NETWORK) | ROUTING DESTINATION |
|---|---|
| N 1 4 | OWN ROUTER |
| N 1 3 | LOCAL ROUTER 13 |
| N 1 5 | LOCAL ROUTER 15 |
| OTHERS | AREA ROUTER 12 | ← ROUTE TO AREA ROUTER

FIG. 17

212 AREA ROUTING TABLE OF ART12

| DESTINATION (NETWORK) | ROUTING DESTINATION | ADDITIONAL INFORMATION 1 | ADDITIONAL INFORMATION 2 |
|---|---|---|---|
| N10 | AREA ROUTER 11 | | |
| N11 | AREA ROUTER 11 | | |
| N12 | AREA ROUTER 11 | | |
| N13 | LOCAL ROUTER 14 | LOCAL ROUTER 13 | |
| N14 | LOCAL ROUTER 14 | | |
| N15 | LOCAL ROUTER 14 | LOCAL ROUTER 15 | |
| N16 | LOCAL ROUTER 14 | LOCAL ROUTER 15 | LOCAL ROUTER 16 |
| OTHERS | AREA ROUTER 11 | | |

← ROUTE TO WIDE ROUTER

FIG. 18

| DESTINATION (NETWORK) | ROUTING DESTINATION |
|---|---|
| N10 | AREA ROUTER 10 |
| N11 | AREA ROUTER 10 |
| N12 | AREA ROUTER 10 |
| N13 | AREA ROUTER 12 |
| N14 | AREA ROUTER 12 |
| N15 | AREA ROUTER 12 |
| N16 | AREA ROUTER 12 |
| OTHERS | WIDE ROUTER 11 |

212 AREA ROUTING TABLE OF ART11

← ROUTE TO WIDE ROUTER

FIG. 19

212 AREA ROUTING TABLE OF ART10

| DESTINATION (NETWORK) | ROUTING DESTINATION | ADDITIONAL INFORMATION 1 | ADDITIONAL INFORMATION 2 |
|---|---|---|---|
| N10 | LOCAL ROUTER 12 | LOCAL ROUTER 10 | |
| N11 | LOCAL ROUTER 12 | LOCAL ROUTER 11 | |
| N12 | LOCAL ROUTER 12 | | |
| N13 | AREA ROUTER 11 | | |
| N14 | AREA ROUTER 11 | | |
| N15 | AREA ROUTER 11 | | |
| N16 | AREA ROUTER 11 | | |
| OTHERS | AREA ROUTER 11 | | | ← ROUTE TO WIDE ROUTER

FIG. 20

112 SLIM ROUTING TABLE OF LRT12

| DESTINATION (NETWORK) | ROUTING DESTINATION |
|---|---|
| N12 | OWN ROUTER |
| N10 | LOCAL ROUTER 10 |
| N11 | LOCAL ROUTER 11 |
| OTHERS | AREA ROUTER 10 | ← ROUTE TO AREA ROUTER

NNS COMMUNICATION NETWORK SYSTEM

FIG. 22

112 SLIM ROUTING TABLE OF LRT14

| DESTINATION (NETWORK) | ROUTING DESTINATION |
|---|---|
| N 1 4 | OWN ROUTER |
| N 1 3 | LOCAL ROUTER 13 |
| N 1 5 | LOCAL ROUTER 15 |
| OTHERS | AREA ROUTER 12 | ← ROUTE TO AREA ROUTER

FIG. 23

212 AREA ROUTING TABLE OF ART12

| DESTINATION (NETWORK) | ROUTING DESTINATION | ADDITIONAL INFORMATION 1 | ADDITIONAL INFORMATION 2 |
|---|---|---|---|
| N10 | AREA ROUTER 11 | | |
| N11 | AREA ROUTER 11 | | |
| N12 | AREA ROUTER 11 | | |
| N13 | LOCAL ROUTER 14 | LOCAL ROUTER 13 | |
| N14 | LOCAL ROUTER 14 | | |
| N15 | LOCAL ROUTER 14 | LOCAL ROUTER 15 | |
| N16 | LOCAL ROUTER 14 | LOCAL ROUTER 15 | LOCAL ROUTER 16 |
| OTHERS | AREA ROUTER 11 | | | ← ROUTE TO WIDE ROUTER

FIG. 26

| DESTINATION (NETWORK) | ROUTING DESTINATION |
|---|---|
| N 1 5 | OWN ROUTER |
| N 1 6 | LOCAL ROUTER 15 |
| OTHERS | LOCAL ROUTER 15 |

112 SLIM ROUTING TABLE OF LRT15

← ROUTE TO AREA ROUTER

NNS COMMUNICATION NETWORK SYSTEM

FIG. 28

112 SLIM ROUTING TABLE OF LRT14

| DESTINATION (NETWORK) | ROUTING DESTINATION |
|---|---|
| N14 | OWN ROUTER |
| N13 | LOCAL ROUTER 13 |
| N15 | LOCAL ROUTER 15 |
| OTHERS | AREA ROUTER 12 |

← ROUTE TO AREA ROUTER

FIG. 29

212 AREA ROUTING TABLE OF ART12

| DESTINATION (NETWORK) | ROUTING DESTINATION | ADDITIONAL INFORMATION 1 | ADDITIONAL INFORMATION 2 |
|---|---|---|---|
| N10 | AREA ROUTER 11 | | |
| N11 | AREA ROUTER 11 | | |
| N12 | AREA ROUTER 11 | | |
| N13 | LOCAL ROUTER 14 | LOCAL ROUTER 13 | |
| N14 | LOCAL ROUTER 14 | | |
| N15 | LOCAL ROUTER 14 | LOCAL ROUTER 15 | |
| N16 | LOCAL ROUTER 14 | LOCAL ROUTER 15 | LOCAL ROUTER 16 |
| OTHERS | AREA ROUTER 11 | | |

← ROUTE TO WIDE ROUTER

FIG. 30

212 AREA ROUTING TABLE OF ART11

| DESTINATION (NETWORK) | ROUTING DESTINATION | ADDITIONAL INFORMATION 1 | ADDITIONAL INFORMATION 2 |
|---|---|---|---|
| N10 | AREA ROUTER 10 | | |
| N11 | AREA ROUTER 10 | | |
| N12 | AREA ROUTER 10 | | |
| N13 | AREA ROUTER 12 | | |
| N14 | AREA ROUTER 12 | | |
| N15 | AREA ROUTER 12 | | |
| N16 | AREA ROUTER 12 | | |
| OTHERS | WIDE ROUTER 11 | | |

← ROUTE TO WIDE ROUTER

OUTGOING CALL INFORMATION (AT THE TIME WHEN IPV4 IS USED)

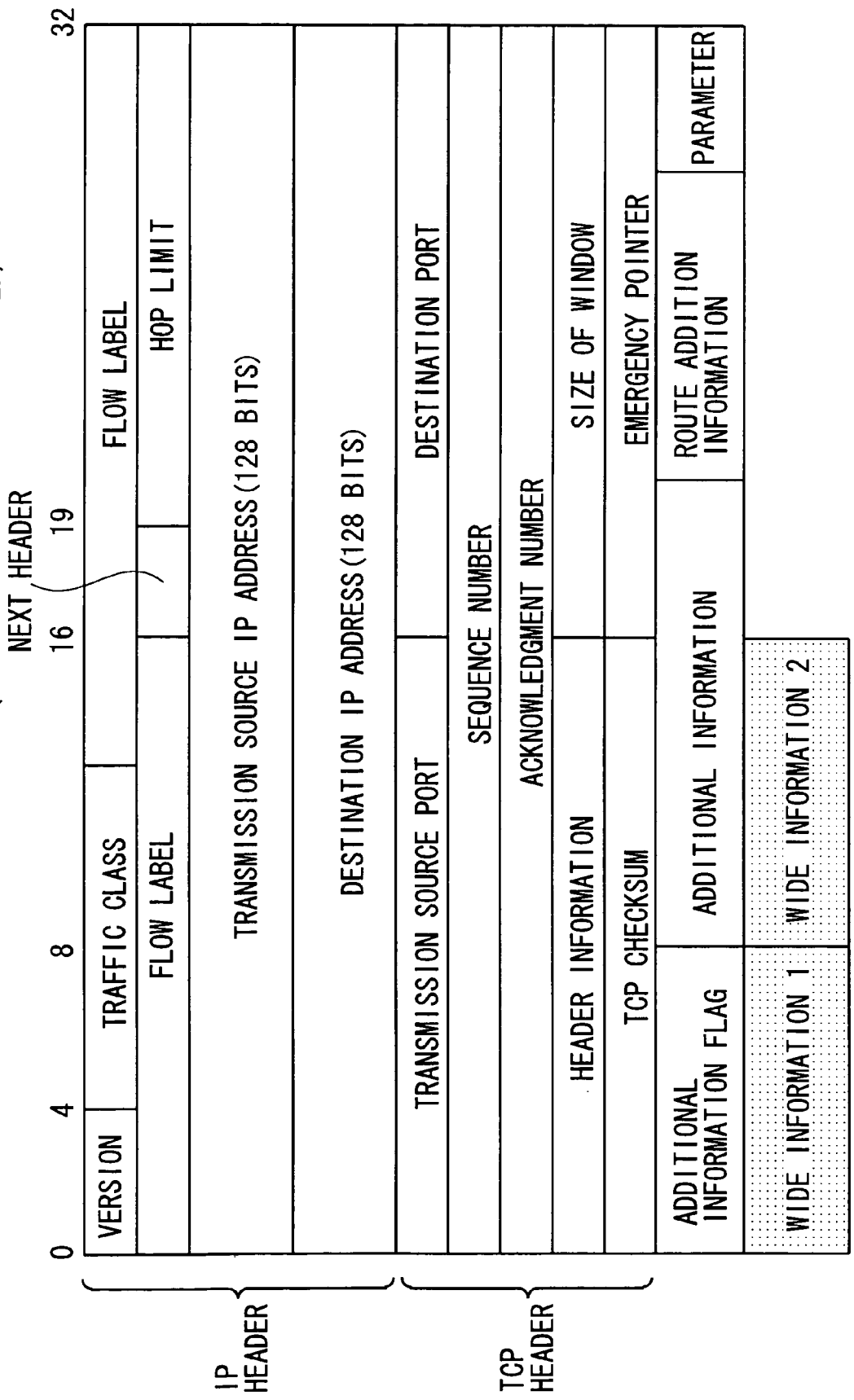

FIG. 33

313 WIDE ROUTING TABLE OF WRT11

| DESTINATION (NETWORK) | INCLUDED WIDE ROUTER | ROUTING DESTINATION | WIDE INFORMATION 1 | WIDE INFORMATION 2 | TOTAL PARAMETER VALUE | PARAMETER |
|---|---|---|---|---|---|---|
| N10 | — | AREA ROUTER 11 | | | | 1 |
| N11 | — | AREA ROUTER 11 | | | | 1 |
| N12 | — | AREA ROUTER 11 | | | | 1 |
| N13 | — | AREA ROUTER 11 | | | | 1 |
| N14 | — | AREA ROUTER 11 | | | | 1 |
| N15 | — | AREA ROUTER 11 | | | | 1 |
| N16 | — | AREA ROUTER 11 | | | | 1 |
| N20 | WIDE ROUTER 14 | WIDE ROUTER 12 | WIDE ROUTER 13 | WIDE ROUTER 14 | 6 | 1 |
| N21 | WIDE ROUTER 14 | WIDE ROUTER 12 | WIDE ROUTER 13 | WIDE ROUTER 14 | 6 | 1 |
| N22 | WIDE ROUTER 14 | WIDE ROUTER 12 | WIDE ROUTER 13 | WIDE ROUTER 14 | 6 | 1 |
| N23 | WIDE ROUTER 14 | WIDE ROUTER 12 | WIDE ROUTER 13 | WIDE ROUTER 14 | 6 | 1 |
| N24 | WIDE ROUTER 14 | WIDE ROUTER 12 | WIDE ROUTER 13 | WIDE ROUTER 14 | 6 | 1 |
| N25 | WIDE ROUTER 14 | WIDE ROUTER 12 | WIDE ROUTER 13 | WIDE ROUTER 14 | 6 | 1 |

FIG. 34

312 PARAMETER TABLE OF WRT11

| SECTION | LINE SPEED | NUMBER OF HOPS | SECURITY LEVEL |
|---|---|---|---|
| WIDE ROUTER 11~WIDE ROUTER 10 | 4 | 1 | 2 |
| WIDE ROUTER 10~WIDE ROUTER 14 | 4 | 1 | 3 |
| WIDE ROUTER 11~WIDE ROUTER 12 | 2 | 1 | 4 |
| WIDE ROUTER 12~WIDE ROUTER 13 | 2 | 1 | 1 |
| WIDE ROUTER 13~WIDE ROUTER 14 | 2 | 1 | 2 |
| WIDE ROUTER 11~WIDE ROUTER 15 | 3 | 1 | 2 |
| WIDE ROUTER 15~WIDE ROUTER 16 | 3 | 1 | 2 |
| WIDE ROUTER 16~WIDE ROUTER 14 | 3 | 1 | 1 |

FIG. 35

313 WIDE ROUTING TABLE OF WRT14

| DESTINATION (NETWORK) | INCLUDED WIDE ROUTER | ROUTING DESTINATION | WIDE INFORMATION 1 | WIDE INFORMATION 2 | TOTAL PARAMETER VALUE | PARAMETER |
|---|---|---|---|---|---|---|
| N10 | WIDE ROUTER 11 | WIDE ROUTER 13 | WIDE ROUTER 12 | WIDE ROUTER 11 | 6 | 1 |
| N11 | WIDE ROUTER 11 | WIDE ROUTER 13 | WIDE ROUTER 12 | WIDE ROUTER 11 | 6 | 1 |
| N12 | WIDE ROUTER 11 | WIDE ROUTER 13 | WIDE ROUTER 12 | WIDE ROUTER 11 | 6 | 1 |
| N13 | WIDE ROUTER 11 | WIDE ROUTER 13 | WIDE ROUTER 12 | WIDE ROUTER 11 | 6 | 1 |
| N14 | WIDE ROUTER 11 | WIDE ROUTER 13 | WIDE ROUTER 12 | WIDE ROUTER 11 | 6 | 1 |
| N15 | WIDE ROUTER 11 | WIDE ROUTER 13 | WIDE ROUTER 12 | WIDE ROUTER 11 | 6 | 1 |
| N16 | WIDE ROUTER 11 | WIDE ROUTER 13 | WIDE ROUTER 12 | WIDE ROUTER 11 | | |
| N20 | — | AREA ROUTER 21 | | | | |
| N21 | — | AREA ROUTER 21 | | | | |
| N22 | — | AREA ROUTER 21 | | | | |
| N23 | — | AREA ROUTER 21 | | | | |
| N24 | — | AREA ROUTER 21 | | | | |
| N25 | — | AREA ROUTER 21 | | | | |

FIG. 36

212 AREA ROUTING TABLE OF ART21

| DESTINATION (NETWORK) | ROUTING DESTINATION |
|---|---|
| N20 | AREA ROUTER 20 |
| N21 | AREA ROUTER 20 |
| N22 | AREA ROUTER 20 |
| N23 | AREA ROUTER 22 |
| N24 | AREA ROUTER 22 |
| N25 | AREA ROUTER 22 |
| OTHERS | WIDE ROUTER 14 |

FIG. 37

212 AREA ROUTING TABLE OF ART20

| DESTINATION (NETWORK) | ROUTING DESTINATION | ADDITIONAL INFORMATION 1 | ADDITIONAL INFORMATION 2 |
|---|---|---|---|
| N20 | LOCAL ROUTER 21 | LOCAL ROUTER 20 | |
| N21 | LOCAL ROUTER 21 | | |
| N22 | LOCAL ROUTER 21 | LOCAL ROUTER 22 | |
| OTHERS | AREA ROUTER 21 | | |

FIG. 38

112 SLIM ROUTING TABLE OF LRT21

| DESTINATION (NETWORK) | ROUTING DESTINATION | |
|---|---|---|
| N 2 1 | OWN ROUTER | |
| N 2 2 | LOCAL ROUTER 22 | |
| OTHERS | LOCAL ROUTER 15 | ← ROUTE TO AREA ROUTER |

FIG. 39

112 SLIM ROUTING TABLE OF LRT20

| DESTINATION (NETWORK) | ROUTING DESTINATION | |
|---|---|---|
| N 2 0 | OWN ROUTER | |
| OTHERS | LOCAL ROUTER 21 | ← ROUTE TO AREA ROUTER |

FIG. 40

313 WIDE ROUTING TABLE OF WRT11 (N20: ADD NUMBER OF HOPS)

| DESTINATION (NETWORK) | INCLUDED WIDE ROUTER | ROUTING DESTINATION | WIDE INFORMATION 1 | WIDE INFORMATION 2 | TOTAL PARAMETER VALUE | PARAMETER |
|---|---|---|---|---|---|---|
| N10 | — | AREA ROUTER 11 | | | | 1 |
| N11 | — | AREA ROUTER 11 | | | | 1 |
| N12 | — | AREA ROUTER 11 | | | | 1 |
| N13 | — | AREA ROUTER 11 | | | | 1 |
| N14 | — | AREA ROUTER 11 | | | | 1 |
| N15 | — | AREA ROUTER 11 | | | | 1 |
| N16 | — | AREA ROUTER 11 | | | | 1 |
| N20 | WIDE ROUTER 14 | WIDE ROUTER 12 | WIDE ROUTER 13 | WIDE ROUTER 14 | 6 | 1 |
| N21 | WIDE ROUTER 14 | WIDE ROUTER 12 | WIDE ROUTER 13 | WIDE ROUTER 14 | 6 | 1 |
| N22 | WIDE ROUTER 14 | WIDE ROUTER 12 | WIDE ROUTER 13 | WIDE ROUTER 14 | 6 | 1 |
| N23 | WIDE ROUTER 14 | WIDE ROUTER 12 | WIDE ROUTER 13 | WIDE ROUTER 14 | 6 | 1 |
| N24 | WIDE ROUTER 14 | WIDE ROUTER 12 | WIDE ROUTER 13 | WIDE ROUTER 14 | 6 | 1 |
| N25 | WIDE ROUTER 14 | WIDE ROUTER 12 | WIDE ROUTER 13 | WIDE ROUTER 14 | 6 | 1 |
| N20 | WIDE ROUTER 14 | WIDE ROUTER 10 | WIDE ROUTER 14 | | 2 | 2 |

NNS COMMUNICATION NETWORK SYSTEM

FIG. 42

112 SLIM ROUTING TABLE OF LRT16

| DESTINATION (NETWORK) | ROUTING DESTINATION |
|---|---|
| N 1 6 | OWN ROUTER |
| N 1 5 | LOCAL ROUTER 15 |
| OTHERS | LOCAL ROUTER 15 |

← ROUTE TO AREA ROUTER

FIG. 43

112 SLIM ROUTING TABLE OF LRT15

| DESTINATION (NETWORK) | ROUTING DESTINATION |
|---|---|
| N 1 5 | OWN ROUTER |
| N 1 6 | LOCAL ROUTER 16 |
| N 1 4 | LOCAL ROUTER 14 |
| OTHERS | LOCAL ROUTER 14 |

← ROUTE TO AREA ROUTER

FIG. 44

112 SLIM ROUTING TABLE OF LRT14

| DESTINATION (NETWORK) | ROUTING DESTINATION |
|---|---|
| N 1 4 | OWN ROUTER |
| N 1 5 | LOCAL ROUTER 15 |
| N 1 3 | LOCAL ROUTER 13 |
| OTHERS | AREA ROUTER 12 |

← ROUTE TO AREA ROUTER

FIG. 45

112 SLIM ROUTING TABLE OF LRT13

| DESTINATION (NETWORK) | ROUTING DESTINATION |
|---|---|
| N 1 3 | OWN ROUTER |
| OTHERS | LOCAL ROUTER 14 |

← ROUTE TO AREA ROUTER

FIG. 46

212 AREA ROUTING TABLE OF ART12

| DESTINATION (NETWORK) | ROUTING DESTINATION | ADDITIONAL INFORMATION 1 | ADDITIONAL INFORMATION 2 |
|---|---|---|---|
| N13 | LOCAL ROUTER 14 | LOCAL ROUTER 13 | |
| N14 | LOCAL ROUTER 14 | | |
| N15 | LOCAL ROUTER 14 | LOCAL ROUTER 15 | |
| N16 | LOCAL ROUTER 14 | LOCAL ROUTER 15 | LOCAL ROUTER 16 |

FIG. 47

212 AREA ROUTING TABLE OF ART12
(AT THE TIME WHEN LRT13 IS DELETED)

| DESTINATION (NETWORK) | ROUTING DESTINATION | ADDITIONAL INFORMATION 1 | ADDITIONAL INFORMATION 2 |
|---|---|---|---|
| N14 | LOCAL ROUTER 14 | | |
| N15 | LOCAL ROUTER 14 | LOCAL ROUTER 15 | |
| N16 | LOCAL ROUTER 14 | LOCAL ROUTER 15 | LOCAL ROUTER 16 |

COMMUNICATION NETWORK SYSTEM

This application is a continuing application, filed under 35 U.S.C. §111(a), of International Application PCT/JP02/11779, filed Nov. 12, 2002.

BACKGROUND OF THE INVENTION

The present invention relates to a communication network system, in particular, a next-generation communication network system that adopts unique routing processing.

In a conventional communication network system, since respective routers, which constitute an AS (Autonomous System) serving as a network having a certain operation policy, perform routing processing (route selection processing) in accordance with a routing protocol such as an RIP (Routing Information Protocol) or an OSPF (Open Shortest Path First), processing loads applied to the respective routers are large. As a result, an amount of route information (routing information) flowing in the network increases, and a load on the network side increases.

Here, the RIP adopts a routing processing method of distance vectors, in which routers adjacent to each other exchange route information one after another to thereby make it possible to collect and set route information of the entire network. This RIP applies to a small-scale network effectively. In addition, in the OSPF, the respective routers grasp a structure of the entire network to make it possible to select an optimum route from the viewpoint of this structure. This OSPF applies to a large-scale network effectively.

In the BGP-4 (Border Gateway Protocol Version 4) or the like serving as an inter-AS routing protocol applied to the conventional communication network system, since routing processing is performed according to the number of pieces of route information among ASs (the number of ASs), for example, in the case in which a line is thin (a bandwidth of a transmission path is narrow) or the ASs are physically distant from one another, the routing processing is not always appropriate.

The BGP-4 is a mechanism of route control in inter-provider communication in an internet backbone constituted by providers and the like connecting to one another. In this GBP-4, it is possible to avoid this inconvenience tentatively according to a setting for operating route information.

SUMMARY OF THE INVENTION

It is an object of the present invention to provide a technique that makes it possible to significantly reduce processing loads in a hierarchical network and a relay apparatus.

It is another object of the present invention to provide a technique that makes it possible to avoid automatic selection of a route, in which the number of ASs on the route is minimized, regardless of inconvenience in the case in which BGP-4 or the like is adopted as an inter-AS routing protocol, that is, regardless of the fact that a line is thin (a transmission bandwidth is narrow) or ASs are physically distant from one another.

It is still another object of the present invention to provide a technique that allows efficient communication as a hierarchical network as a whole.

It is still another object of the present invention to provide a technique that makes it possible to apply priority control according to parameters flexibly in a higher hierarchy network to be a base network.

It is still another object of the present invention to provide a technique where optimum routing processing is applicable according to various communication forms in a hierarchical network.

In order to achieve the above-mentioned object, according to a first aspect of the present invention, there is provided a communication network system including:

plural lower hierarchy networks having plural first relay apparatuses that accommodate at least one terminal in a distributed arrangement, respectively, and that adjacent ones of which are connected by a line, respectively; and an intermediate hierarchy network having plural second relay apparatuses, adjacent ones of which are connected by a line, and connecting the plural lower hierarchy networks via the second relay apparatuses in edge positions to be connected with the first relay apparatuses in respective edge positions in the plural lower hierarchy networks, in which:

each of the first relay apparatuses in the plural lower hierarchy networks has a first routing table that holds information limited to routing information corresponding to the first relay apparatus and routing information on at least one of the first relay apparatuses and the second relay apparatuses in the edge positions that come into an adjacent state through the line; and each of the second relay apparatuses in the intermediate hierarchy network has a second routing table that holds information including routing information on at least one of the second relay apparatuses and the first relay apparatuses in the edge positions that come into an adjacent state through the line.

According to a second aspect of the present invention, there is provided a communication network system, further including an upper hierarchy network having, when a plurality of the intermediate hierarchy networks are present, plural third relay apparatuses, adjacent ones of which are connected by a line, and connecting the plural intermediate hierarchy networks via the third relay apparatuses in edge positions that are connected with the second relay apparatuses in the respective edge positions in the plural intermediate hierarchy networks by a line, in which:

the second routing table of each of the second relay apparatuses in the plural intermediate hierarchy networks further holds routing information for routing to the third relay apparatuses in the edge positions; and each of the third relay apparatuses in the edge positions in the upper hierarchy networks makes it possible to perform routing processing based on parameters for specifying a priority of a line in each section of the third relay apparatuses in an adjacent state.

In the communication network system according to the present invention, the upper hierarchy network is a backbone network that connects the plural intermediate hierarchy networks through a high-speed line.

Further, the plural third relay apparatuses in the upper hierarchy network are connected in a mesh shape through a high-speed line, and the plural second relay apparatuses in the intermediate hierarchy networks and the first relay apparatuses in the lower hierarchy networks are connected in a tree structure through a line, respectively. The first, the second, and the third relay apparatuses are routers.

Further, the parameters include at least one of a line bandwidth, the number of hops, a charge, security level, and convergence/failure states.

BRIEF DESCRIPTION OF THE DRAWINGS

FIG. 13 shows an example of a slim routing table of the local router in the first operation example.

FIG. 14 shows an example of the slim routing table of the local router in the first operation example.

FIG. 16 shows an example of a slim routing table of a local router in the second operation example.

FIG. 17 shows an example of an area routing table of an area router in the second operation example.

FIG. 18 shows an example of the area routing table of the area router in the second operation example.

FIG. 19 shows an example of the area routing table of the area router in the second operation example.

FIG. 20 shows an example of the slim routing table of the local router in the second operation example.

FIG. 22 shows an example of a slim routing table of a local router in a third operation example.

FIG. 23 shows an example of an area routing table of an area router in the third operation example.

FIG. 26 shows an example of the slim routing table of the local router in the third operation example.

FIG. 28 shows an example of a slim routing table of a local router in the fourth operation example.

FIG. 29 shows an example of an area routing table of an area router in the fourth operation example.

FIG. 30 shows an example of the area routing table of the area router in the fourth operation example.

FIG. 32 shows a format of outgoing call information in the fourth operation example.

FIG. 33 shows an example of a wide routing table of a wide router in the fourth operation example.

FIG. 34 shows an example of a parameter table of the wide router in the fourth operation example.

FIG. 35 shows an example of the wide routing table of the wide router in the fourth operation example.

FIG. 36 shows an example of the area routing table of the area router in the fourth operation example.

FIG. 37 shows an example of the area routing table of the area router in the fourth operation example.

FIG. 38 shows an example of the slim routing table of the local router in the fourth operation example.

FIG. 39 shows an example of the slim routing table of the local router in the fourth operation example.

FIG. 40 shows an example of a wide routing table of a wide router in the fifth operation example.

FIG. 42 shows an example of a slim routing table of a local router in the sixth operation example.

FIG. 43 shows an example of the slim routing table of the local router in the sixth operation example.

FIG. 44 shows an example of the slim routing table of the local router in the sixth operation example.

FIG. 45 shows an example of the slim routing table of the local router in the sixth operation example.

FIG. 46 shows an example of an area routing table of an area router in the sixth operation example.

FIG. 47 shows an example of the area routing table of the area router in the sixth operation example.

DETAILED DESCRIPTION OF THE PREFERRED EMBODIMENTS

Next, embodiments of the present invention will be explained with reference to the drawings.

[Schematic Structure and Functions of Communication Network System]

First, a schematic structure and functions of a communication network system according to an embodiment of the present invention will be explained with reference to FIG. 1.

A communication network system NNS applicable to the next generation is constituted by plural networks of three hierarchies, namely, a lower (first) hierarchy, an intermediate (second) hierarchy, and an upper (third) hierarchy. Each of the plural networks of the three hierarchies functions as an autonomous system (AS).

This communication network system NNS includes local networks LNWs (LNW11, LNW12, LNW21, and LNW22) as networks of the lower hierarchy, area networks ANWs (ANW1 and ANW2) as networks of the intermediate hierarchy, and a wide network WNW as a network of the upper hierarchy.

The local networks LNWs connect terminals TEs such as computer terminals or IP (Internet Protocol) telephone terminals, which are present in a near distance (e.g., within several kilometers) like one building, through a router serving as a packet relay apparatus (network apparatus). The area networks ANWs connect local networks LNWs expanding in city and district levels (e.g., a distance of several tens kilometers to several hundreds kilometers) In addition, the wide network WNW serving as backbone networks (highway networks) connects area networks ANWs expanding in a geographically wide area (e.g., several hundreds kilometers or more).

Each of the local networks LNWs, the area networks ANWs, and the wide network WNW is constituted by plural routers serving as packet relay apparatuses (network apparatuses). Here, routers included in the local networks LNWs are referred to as local routers LRTs (LRT10 to LRT16, LRT20 to LRT25), routers included in the area networks ANWs are referred to as area routers ARTs (ART10 to ART12, ART20 to ART22), and routers included in the wide network WNW are referred to as wide routers WRTs (WRT10 to WRT16).

The plural wide routers WRTs in the wide network WNW are connected in a mesh shape via a high-speed line, and the plural area routers ARTs in the area networks ANWs and the plural local routers LRTs in the local networks LNWs are connected via a line in a tree structure, respectively.

The plural local routers LRTs in the local networks LNWs constitute sub-networks (which may be described as segments or simply described as networks when no specific limitation is applied) N10 to N16 and N20 to N25, respectively.

Figure 1:
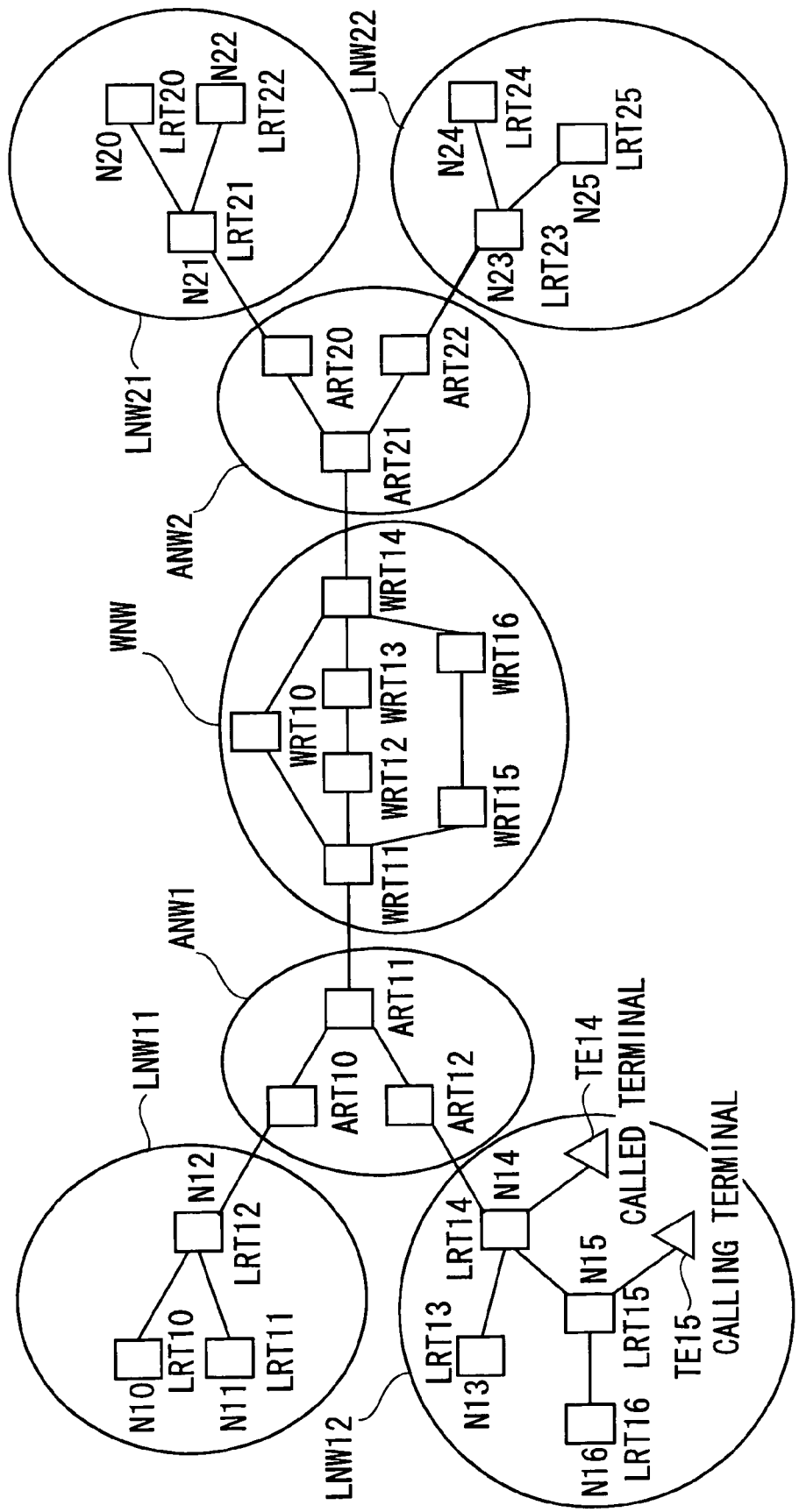
FIG. 1 is a diagram for explaining a structure and a first operation example of a communication network system according to an embodiment of the present invention.

In FIG. 1, only a terminal (called terminal) TE14 connected to the local router LRT14 and a terminal (calling terminal) TE15 connected to the local router LRT15 are shown representatively. Terminals TEs are included in the other local routers LRTs in the same manner. Note that, more strictly, the respective local routers LRTs constituting the sub-networks include the terminals TEs via a layer 2 switch such as a switching hub. However, here, the terminals TEs are not shown in the figure.

To describe this more in detail, the respective wide routers WRTs (WRT10 to WRT16) in the wide network WNW in this communication network system NNS exchange parameters between one another periodically to thereby realize routing (route selection) that gives a top priority to parameters decided in advance in the system (contents of the parameters include data values such as line speed, the number of hops, security level, a charge, and a convergence/failure state).

In the wide network routing, setting by the system (default setting) is possible. In addition, it is also possible to perform routing processing designating parameters individually from the calling-terminal (outgoing call terminal) TE15 or the called (incoming call terminal) TE14.

Here, the wide network routing means routing processing in the wide network WNW. In other words, in the wide network WNW, there are several routes from the wide router WRT at an entrance (an edge wide router WRT corresponding to an entrance position) to the wide router WRT at an exit (en edge wide router WRT corresponding to an exit position). The wide network routing is a routing processing method that is capable of searching a best route when a specific parameter (e.g., a route with a highest line speed or a route in which security is observed most) is given a priority.

In the wide routers WRTs of the wide network WNW, when outgoing call information (or data packet) is received from the area routers ARTs of the area networks ANWs, a header analysis unit described later analyzes whether a parameter request is included in the outgoing call information.

When there is no parameter request in the outgoing call information as a result of the analysis, the wide routers WRTs perform routing based on contents (system setting) of wide routing tables held by the wide routers WRTs in advance as usual. In addition, when there is a parameter request in the outgoing call information, the wide routers WRTs perform wide network routing on the basis of contents of requested parameters.

When there is no routing processing contents of requested parameters in wide routing tables, the wide routers WRTs recognize routing processing for parameters requested from the terminal (the calling terminal or the called terminal) TE side with reference to parameter tables and add a result of the recognition in the wide routing tables. This makes it possible to perform routing processing based on an individual parameter request from the terminal TE.

In the area networks ANWs (ANW1 and ANW2) including plural local networks LNWs in the tree structure, each of the area routers ARTs grasps a lower hierarchy network (a local network LNW connected to the area network ANW) and, when outgoing call information is received from the inside and the outside of the networks (the wide network WNW and the local networks LNWS), routing processing (transfer of the outgoing call information) is performed as described below.

A: Wide network WNW Area network ANW Local network LNW

Concerning outgoing call information sent from the wide network WNW to the local network LNW under the control of its own network (under the control of the area network ANW), the area router ART of the area network ANW adds transfer destination router information (additional information) in the local network LNW to the outgoing call information and transfers the outgoing call information to the local network LNW.

B: Local network LNW Area Network ANW Wide network WNW

The area router ART of the area network ANW applies transfer processing to outgoing call information from the local network LNW to the wide area WNW in another network.

C: Local network LNW Area network ANW Local network LNW

In a communication form of the local network LNW the area network ANW the local network LNW, there are a first communication form for, when communication is performed only in one local network LNW, sending reply information (information instructing to make connection in this route), for example, from the area router ART12 of the area network ANW1 to the calling terminal TE15 to thereby realize communication in one local network LNW12 and a second communication form for, when the area network ANW connect with another local network LNW through the area router ART, realizing communication of, for example, the local network LNW12 the area network ANW1 the local network LNW 11.

As described above, in the first communication form in which connection is made only in one local network LNW not through the area router ART, the area router ART receives outgoing call information from the local network LNW and, when connection is possible in the local network LNW even without passing the area router ART, notifies the calling terminal TE15 of a connection route, which indicates what kind of route paths the calling terminal TE15 should take to connect with the local router LRT on a called side, as reply information. The calling terminal TE15 having received the notification starts re-calling (transmission of outgoing call information and data communication) on the basis of the reply information (route paths) from the area router ART.

In addition, in the second communication form in which connection is made through the area router ART, in order to connect with a calling destination (a local router LRT of another local network LNW to be under the control of the area router ART) through the area router ART, the area router ART adds additional information on a route from the area router ART to the local router LRT on a called side to outgoing call information sent from the local router LRT on a calling side and transmits the outgoing call information to the calling destination routers.

In this communication network system NNS, the local router LRT of the local network LNW performs only routing to a route to a local router LRT adjacent to (directly adjacent to) the local router LRT or an area router ART determined in advance. A load on the local router LRT is reduced significantly by performing minimum necessary routing processing without waste.

When the local router LRT receives outgoing call information from the calling terminal TE15, the local router LRT confirms a destination. When the local router LRT confirms that the destination is not the adjacent local router LRT, the local router LRT transmits the outgoing call information to a route to the area router ART or directly to the area router ART.

At this point, the area router ART judges whether routing processing is possible only in the local network LNW under the control of its own network. When it is judged that the routing processing is possible, the area router ART notifies the calling terminal TE15, which has called the area router ART, of a connection route as reply information. The calling terminal TE15 starts re-calling on the basis of the reply information from the area router ART.

In addition, in this communication network system NNS, the area router ART directly connected to the local network LNW and each of the local routers LRTs (the routers LRTs under the control of the area router ART) exchange routing information to thereby realize simple and efficient network routing. [Detailed Structure and Functions of Communication Network System]

[Local Network LNW, Local Router LRT, and Terminal TE]

Figure 2:
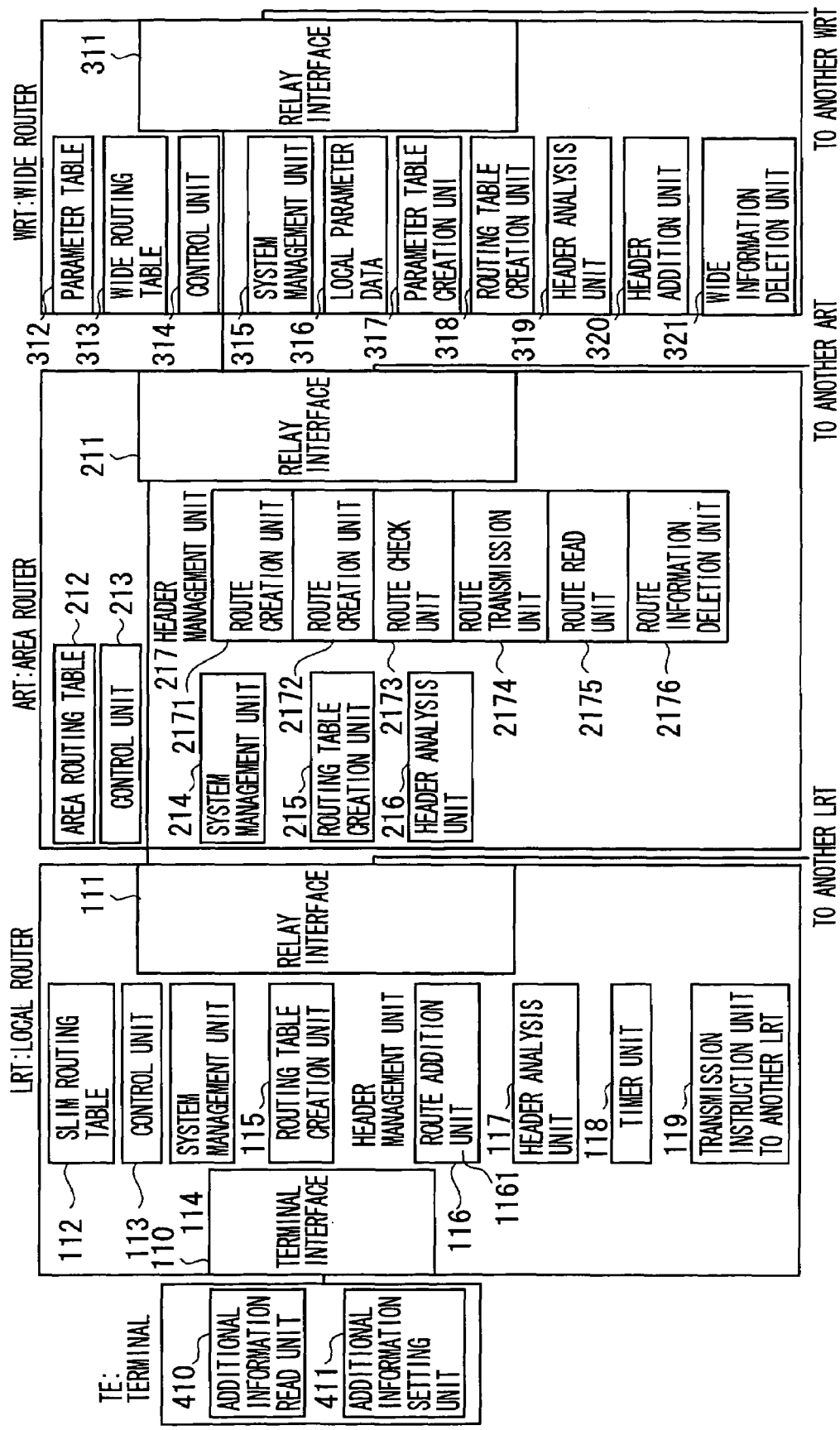
FIG. 2 is a diagram for explaining detailed structures and operations of a local router, an area router, a wide router, and a terminal.

Next, detailed structures and functions of the local network LNW, the local router LRT, and the terminal TE constituting the communication network system NNS according to the embodiment of the present invention will be explained with reference to FIGS. 1 and 2. FIG. 2 shows detailed structures of the local router LRT and the terminal TE together with the area router ART and the wide router WRT.

Each of the local routers LRTs serving as packet relay apparatuses (network apparatuses) constituting the local network LNWs (LNW11, LNW12, LNW21, and LNW22) of the communication network system NNS includes the following elements.

In each of the local routers LRTs, a terminal interface 110 is an interface for including the terminal TE. A relay interface 111 is an interface for connecting with the area router ART of the area network ANW applicable to a network of an intermediate hierarchy or another local router LRT adjacent to the local router LRT.

A slim routing table 112 is a table for managing routing between its own local router LRT and an adjacent router (the local router LRT or the area router ART).

The slim routing table 112 is characterized by not holding unnecessary routing data unlike the case in which a router performs routing processing in accordance with the protocol RIP. Basically, the slim routing table 112 adopts a simple structure in which only network information applicable to its own router and adjacent routers (network addresses, more specifically, IP addresses of sub-networks serving as destinations) as routing destinations. By adopting the simple structure of this slim routing table 112, a load on the local router LRT is reduced significantly.

In the slim routing table 112, in order to limit management to network information applicable to adjacent routers, routing management for only one hop is performed basically. However, it is possible to manage routing destinations such as two hops and three hops depending on a setting.

When the local router LRT including this slim routing table 112 receives outgoing call information from the terminal TE, the local router LRT applies routing processing to an adjacent router only when the local router LRT can recognize a network address applicable to the adjacent router with reference to the slim routing table 112. In other cases, the local router LRT transmits the outgoing call information to all the area routers ARTs or routes to the area routers ARTS.

A control unit 113 in each of the local router LRTs exchanges routing information with adjacent local routers LRTs and exchanges routing information with the area router ART. In other words, in order to obtain routing information for connecting with the adjacent local router LRT and routing information for connecting with the area network ANW side, the control unit 113 exchanges information such as a physical connection state in its own network (exchanges information with the local routers LRTs and notifies the area router ART of information).

A system management unit 114 performs management concerning how control should be performed at the time of convergence and failure as a system. A routing table creation unit 115 sets routing information on the adjacent local routers LRTs and routing information on a route to the area router ART or on routing directly to the area router ART in the slim routing table 112. The routing table creation unit 115 creates the slim routing table 112 by default line setting or by cooperating with the control unit 113.

A header management unit 116 includes a route addition unit 1161. The route addition unit 1161 causes, when outgoing call information is transmitted from its own local router LRT to the area router ART, the area router ART to recognize which local router LRT sent the outgoing call information to the area router ART. According to this function, it is possible to perform comparison and judgment on a route on the area router ART side, that is, judgment on whether a connection is using the local network LNW or through the area router ART.

A header analysis unit 117 analyzes contents of a header portion of a transmission frame such as outgoing call information transmitted from the terminal TE, the adjacent local router LRT, or the area router ART directly connected thereto and cooperates with the control unit 113 to thereby perform routing processing with reference to the slim routing table 112.

In the case in which communication is performed in one local network LNW, reply information for a re-calling request is transmitted from the area router ART to the calling terminal TE, and the calling terminal TE re-calls (retransmits outgoing call information to) the called terminal TE. Thereafter, a data transmission instruction request is sent to the calling terminal TE according to a function of a transmission instruction unit 119 of the local router LRT including the calling terminal TE. The calling terminal TE having received this data transmission instruction request starts data (data packet) communication.

A timer unit 118 is used for timing setting for sending a data transmission instruction request to the calling terminal TE side when a predetermined time (e.g., n seconds) elapses, that is, when a time sufficient for the area router ART to transmit reply information elapses after the calling terminal TE transmits outgoing call information. In other words, in the case of the communication form other than communication in one local network LNW (the local network LNW the area network ANW the local network LNW or the local network LNW the area network ANW the wide network WNW the area network ANW the local network LNW), after a predetermined time based on the setting of the timer unit 118 elapses, a data transmission instruction request is issued to the calling terminal TE by the transmission instruction unit 119. It is possible to set this predetermined time arbitrarily in the timer unit 118.

The calling terminal TE connected to the terminal interface 110 of the local router LRT includes an additional information read unit 410 and an additional information setting unit 411. The additional information read unit 410 reads contents of reply information transmitted from the area router ART. The additional information setting unit 411 sets contents of the reply information transmitted from the area router ART in outgoing call information as additional information and transmits the additional information to the called terminal TE.

The additional information read unit 410 and the additional information setting unit 411 also function on the called terminal TE side in the communication in one local network LNW. Usually, on the called terminal TE side, when the called terminal TE sends a reply or the like to the calling terminal TE, route setting to the calling terminal TE is not recognized. However, it is possible to recognize a reply route to the calling terminal TE in the communication in one local network LNW according to the additional information from the calling terminal TE. In other words, in the case of a reply to outgoing call information from the calling terminal TE in the communication in one local network LNW, the called terminal TE reads the additional information included in the outgoing call information from the calling terminal TE with the additional information read unit 410 and, at the time of reply, sets additional information applicable to a route opposite to the route from the calling terminal TE with the additional information setting unit 411 to send a reply to the calling terminal TE side.

Note that, as described later, when it is desired to carry out wide routing in the wide network WNW on the basis of desired parameters, the calling terminal TE is capable of adding the desired parameters to outgoing call information.

[Area Network ANW and Area Router ART]

Next, detailed structures and functions of the area network ANW and the area router ART constituting the communication network system NNS of the embodiment of the present invention will be explained with reference to FIGS. 1 and 2. FIG. 2 shows a detailed structure of the area router ART.

Each of the area routers ARTs serving as packet relay apparatuses (network apparatuses) constituting the area networks ANWs (ANW1 and ANW2) of the communication network system NNS includes the following elements.

In each of the area routers ARTs, a relay interface 211 is an interface for connecting with the wide router WRT, another area router ART, and the local router LRT.

An area routing table 212 is a table for managing routing in all routes in the area network ANW. In addition, the area routing table 212 is used for performing routing processing to the local network LNW under its control included in the area network ANW and routing processing to the wide network WNW.

A control unit 213 exchanges routing information and the like with another area router ART, the local router LRT, or the wide router WRT. The control unit 213 exchanges information such as a physical connection state in each network in order to obtain routing information for connecting with all the local routers LRTs in the local network LNW included in the area network ANW and routing information for connecting with the wide network WNW side. In other words, the control unit 213 performs collection of information from the local network LNW and exchange of information among the area routers ARTs.

A system management unit 214 performs management concerning how control should be performed at the time of convergence and failure as a system. A routing table creation unit 215 creates the area routing table 212 according to system setting (default setting) or the function of the control unit 213.

A header analysis unit 216 analyzes a header portion of a frame of outgoing call information, a data packet, or the like transmitted from the wide network WNW, the area network ANW, or the local network LNW to allow routing processing with reference to the area routing table 212.

Routing by the area router ART is classified into the following three types according to functions of the header analysis unit 216 and first and second route creation units 2171 and 2172 of a header management unit 217.

(1) Frame relay from the wide network WNW to the local network LNW:

The first route creation unit 2171 of the header management unit 217 creates additional information by adding a route in the local network LNW to an additional information area in a header portion of outgoing call information. At this point, the route creation unit 2171 sets an additional information flag to OFF "0".

(2) Frame relay from the local network LNW to the local network LNW through the area router ART (a communication form for relaying a frame from the local router LRT on an enter side to the local router LRT on an exit side through the area router ART):

In a route check unit 2173 of the header management unit 217 of the area router ART, it is judged whether it is necessary to make connection through the area router ART. As a result, when it is judged that it is necessary to make connection through the area router ART (when routes do not overlap), the route creation unit 2171 of the header management unit 217 adds route information used in the local network LNW on an exit side to a header portion. At this point, the route creation unit 2171 sets the additional information flag to OFF "0".

(3) Frame relay from the local network LNW to the local network LNW even without passing the area router ART:

In the route check unit 2173 of the header management unit 217 of the area router ART, it is judged whether it is necessary to make connection through the area router ART. As a result, when it is judged that it is unnecessary to make connection through the area router ART (when routes overlap), the second route creation unit 2172 of the header management unit 217 adds route information (routing information) from a calling terminal to a called terminal in one local network LNW to a header portion as replay information. At this point, the route creation unit 2172 sets the additional information flag to ON "1".

A route information deletion unit 2176 of the header management unit 217 reads route information included in a route additional information area in a header portion of outgoing call information received from the local network LNW and, then, deletes the route information in the route additional information area included in the outgoing call information. Note that, in the area router ART, deletion processing is always performed after check in the route check unit 2173.

(1) A case in which outgoing call information is relayed from the area network ANW to the wide network WNW:

When outgoing call information is sent from the local network LNW to the area network ANW and, as a result of analysis of a header portion of the outgoing call information in the header analysis unit 216 of the area router ART, it is judged that the outgoing call information is sent to the wide network WNW, route information is deleted in the route information deletion unit 2176 of the header management unit 217.

(2) Deletion after check by the route check unit 2173:

When outgoing call information has a sub-network in the local network LNW under the control of the area network ANW as a destination, after the route check unit 2173 of the header management unit 217 checks overlap of routes, the route information deletion unit 2176 deletes route information included in a header portion of the outgoing call information.

The header management unit 217 further includes a route read unit 2175 and a route transmission unit 2174. The route read unit 2175 reads route information included in a route additional information area in the header portion of the outgoing call information transmitted from the local network LNW. After the reading of this route information, the route check unit 2173 checks a section where routes overlap.

When there is a section in which routes overlap, the area router ART creates replay information for allowing routing only in the local network LNW with the route creation unit 2172 and transmits the reply information to the calling terminal TE according to the function of the route transmission unit 2174. Note that the route transmission unit 2174 performs not only the transmission of the reply information but also transmission of additional information in communication of the wide network WNW the area network ANW the local network LNW, or the local network LNW the area network ANW the local network LNW.

[Wide Network WNW and Wide Router WRT]

Next, detailed structures and functions of the wide network WNW and the wide router WRT constituting the communication network system NNS of the embodiment of the present invention will be explained with reference to FIGS. 1 and 2. FIG. 2 shows the detailed structure of the wide router WRT.

Each of the wide routers WRTs serving as packet relay apparatuses (network apparatuses) constituting the wide network WNW of the communication network system NNS includes the following elements.

In each of the wide routers WRTs, a relay interface 311 is an interface for connecting another wide router WRT or area router ART and the own wide router WRT. A parameter table 312 is a table for managing parameters of a line (a line bandwidth, the number of hops, a charge, security level, a convergence/failure state, etc.) in a section in the wide network WNW, that is, a section between the wide router WRT and each of the wide routers WRTs directly connected to the wide router WRT concerned.

A wide routing table 313 is a table for managing routing in all routes in the wide network WNW. In the wide network WNW, it is made possible to carry out wide routing processing based on the parameters by referring to the wide routing table 313.

A control unit 314 performs control for exchanging information on parameters of each line between routers (among the wide routers WRTs) in the wide network WNW periodically. A system management unit 315 manages how control should be performed for determination on matters concerning the entire system (e.g., treatment of parameters given priority as wide network routing and measures at the time of convergence/failure).

A local parameter data 316 indicates data values such as a line bandwidth, the number of hops, a charge, security level, and a convergence/failure state in each section between the wide router WRT and each of the adjacent wide routers WRTs around the wide router WRT concerned. The local parameter data 316 is individual parameter data for each of the wide routers WRTs.

A parameter table creation unit 317 creates the parameter table 312 on the basis of parameter information exchange with the adjacent wide router WRT performed by the control unit 314 and the local parameter data 316.

A routing table creation unit 318 creates the wide routing table 313 on the basis of the parameter table 312. The wide routing table 313 is basically uniform as a system but makes routing processing in the wide network WNW possible for each piece of outgoing call information in response to an individual parameter request included in outgoing call information from the calling terminal TE or the called terminal TE.

A header analysis unit 319 performs analysis of a header portion of a frame of outgoing call information or the like transmitted from the wide network WNW or the area network ANW in order to make routing processing referring to the wide routing table 313 possible. When a frame is transferred from the wide network WNW, the header analysis unit 319 confirms presence or absence of route information in the wide network WNW as wide information. When the wide information is present, the control unit 314 transfers the frame to the wide router WRT designated next.

When a routing request in an individual parameter is received from the calling terminal TE or the called terminal TE, a header addition unit 320 of the wide router WRT at an entrance adds wide information for routing processing in the wide network WNW.

When outgoing call information is transferred from the area network ANW side, the following processing is performed in the wide router WRT. First, the header analysis unit 319 confirms whether a parameter request is present in the outgoing call information. When there is no parameter request in the outgoing call information, the control unit 314 performs wide routing processing on the basis of parameters of system setting (default setting) determined in the system in advance. When there is a parameter request different from the system setting in the outgoing call information, the control unit 314 calculates an optimum route with reference to the parameter table 312, and the routing table creation unit 318 adds route information of a calculation result to the wide routing table 313.

In the wide router WRT at the entrance, the control unit 314 obtains a route meeting the parameters from the wide routing table 313 to which a route is added anew. The wide router WRT adds wide information to the outgoing call information with the header addition unit 320 and transfers the outgoing call information to the wide router WRT, to which the outgoing call information should be transferred next, with the control unit 314.

The next wide router WRT that has received the transferred outgoing call information reads the wide information included in the outgoing call information with the header analysis unit 319 and transfers the outgoing call information to the wide router WRT to which the outgoing call information should be transferred next. The outgoing call information is transferred to the wide router WRT at an exit of the wide network WNW according to the series of processing.

At the time of routing processing in the wide network WNW, when the wide router WRT transfers outgoing call information to the wide router WRT in the next stage, the wide information deletion unit 321 deletes wide information (wide information to the wide router) that is included before the transfer is received. Note that the wide information referred to in the next wide router WRT is not deleted.

[Other Functions of Respective Routers]

In the communication network system NNS described above, the local routers LRTs, the area routers ART, and the wide routers WRT serving as packet relay apparatuses (network apparatuses) constituting the local networks LNWs, the area networks ANWs, and the wide network WNW and the terminals TEs included in the local router LRT further have the following functions. Note that a part of the functions already described are explained again.

(1) In the area router ART and the wide router WRT, a failure state and a convergence state of a network are judged, and contents of the judgment are added to the respective routing tables 212 and 312, whereby operation efficiency of the entire network is increased.

(2) The wide routers WRT periodically exchanges parameter information of respective sections, in which the wide routers WRTs connect with other wide routers WRTs, to realize routing processing that gives a top priority to parameters determined in advance as a system.

(3) When routing processing contents in parameters requested from the terminal TE are not present in the wide routing table 313, the wide router WRT grasps the routing processing contents from the parameter table 312 and adds the grasped contents to the wide routing table 313 to-make it possible to also cope with an individual parameter request.

(4) The area router ART grasps a network of a lower hierarchy (the local network LNW connected to the area network ANW) and, when outgoing call information or data is received form the inside or the outside of the network (the wide network WNW and the local network LNW), performs routing processing.

(5) Depending upon contents of an additional information flag included in the received outgoing call information ("1": ON at the time of communication in the local network LNW and "0": OFF in the case of reception from the wide network WNW or the area network ANW), when "1": ON at the time of communication in the local network LNW, the area router ART sets a route opposite to a route in the received additional information in an additional information area to make it possible to send a reply from the terminal TE.

(6) As a result of checking the additional information flag in the additional information read unit 410, when the additional information flag is "1": ON, the calling terminal TE having received the outgoing call information sets the additional information in the additional information setting unit 411 and performs re-calling.

(7) As a result of the routing processing that refers to the area routing table 212, when the destination is not present, the area router ART having received the outgoing call information transfers the outgoing call information to a route to the wide router WRT.

(8) In an algorithm characterized by analyzing and comparing routes to be passed in the route check unit 2173 for judging overlap of routes, the area router ART realizes judgment on whether the routes overlap, that is, whether communication is communication with the intervention of the area router ART or communication in the local network LNW.

(9) As a result of the routing processing that refers to the area routing table 212, when the destination exists and there is no route information in the outgoing call information, the area router ART having received the outgoing call information confirms whether there is additional information in the routing information and, when there is additional information, adds the additional information (indicating a route of routing in the local network LNW) to the received outgoing call information and transfers the outgoing call information to the local network LNW side. Here, when the area router ART adds the additional information to the received outgoing call information, the area router ART sets "0": OFF in the additional information flag and transfers the outgoing call information to the local network LNW side.

(10) As a result of analyzing the outgoing call information with the header analysis unit 319, when wide information (indicating a routing route in the wide network WNW) is included in the outgoing call information, the wide router WRT having received the outgoing call information transfers the outgoing call information to the wide router WRT in the next stage in accordance with an instruction of the wide information.

(11) As a result of analyzing the outgoing call information with the header analysis unit 319, when wide information is not included in the outgoing call information, the wide router WRT having received the outgoing call confirms presence or absence of parameter information and, when parameters are designated, performs wide routing in accordance with contents of the parameters.

(12) As a result of analyzing the outgoing call information with the header analysis unit 319, when wide information is not included in the outgoing call information, the wide router WRT having received the outgoing call confirms presence or absence of parameter information and, when parameters are not designated, performs wide routing with the parameters of default setting.

(13) The wide router WRT having received the outgoing call information confirms presence or absence of parameter information with the header analysis unit 319 and, when parameters are designated but there is no routing information of the parameters on the wide routing table 313, calculates an optimum routing route for parameters required by the calling terminal TE or the called terminal TE from the parameter table 312 and adds and registers a result of the calculation in the wide routing table 313 to perform wide routing processing.

(14) In calculating an optimum routing route with reference to the parameter table 312, the wide router WRT is capable of combining sections, in which the wide routers WRTs are likely to connect with each other, from the parameter table 312 and deriving an optimum route from calculation and comparison of total values of parameters in the sections.

(15) The local router LRT exchanges routing information with adjacent local routers LRTs using the control unit 113.

(16) The area router ART notifies the adjacent local network LNW of area router information using the control unit 213.

At this point, the local router LRT having received the area router information from the area router ART notifies all the local routers LRTs in the local network LNW of this area router information.

In addition, when there is overlap of area router information in the local network LNW, the local router LRT is capable of avoiding the overlap in the local network LNW by adding a call number to the area router information.

(17) When the local router LRT is added anew, the local router LRT notifies the area router ART of local router information. In addition, when the local router LRT is deleted, the local router LRT notifies the area router ART of the local router information.

(18) When the local router LRT is added anew or deleted, the area router ART receives the local router information and updates the area routing table 212 in the routing table creation unit 215 to thereby reflect information on the added or deleted local router LRT on the area routing table 212.

(19) When the local router LRT is added anew or deleted, the local router LRT exchanges local router information in the local network LNW and updates the slim routing table 112 using the routing table creation unit 115.

[Operations of Communication Network System]

Next, specific operation examples in the communication network system NNS according to the embodiment of the present invention will be explained.

Figure 3:
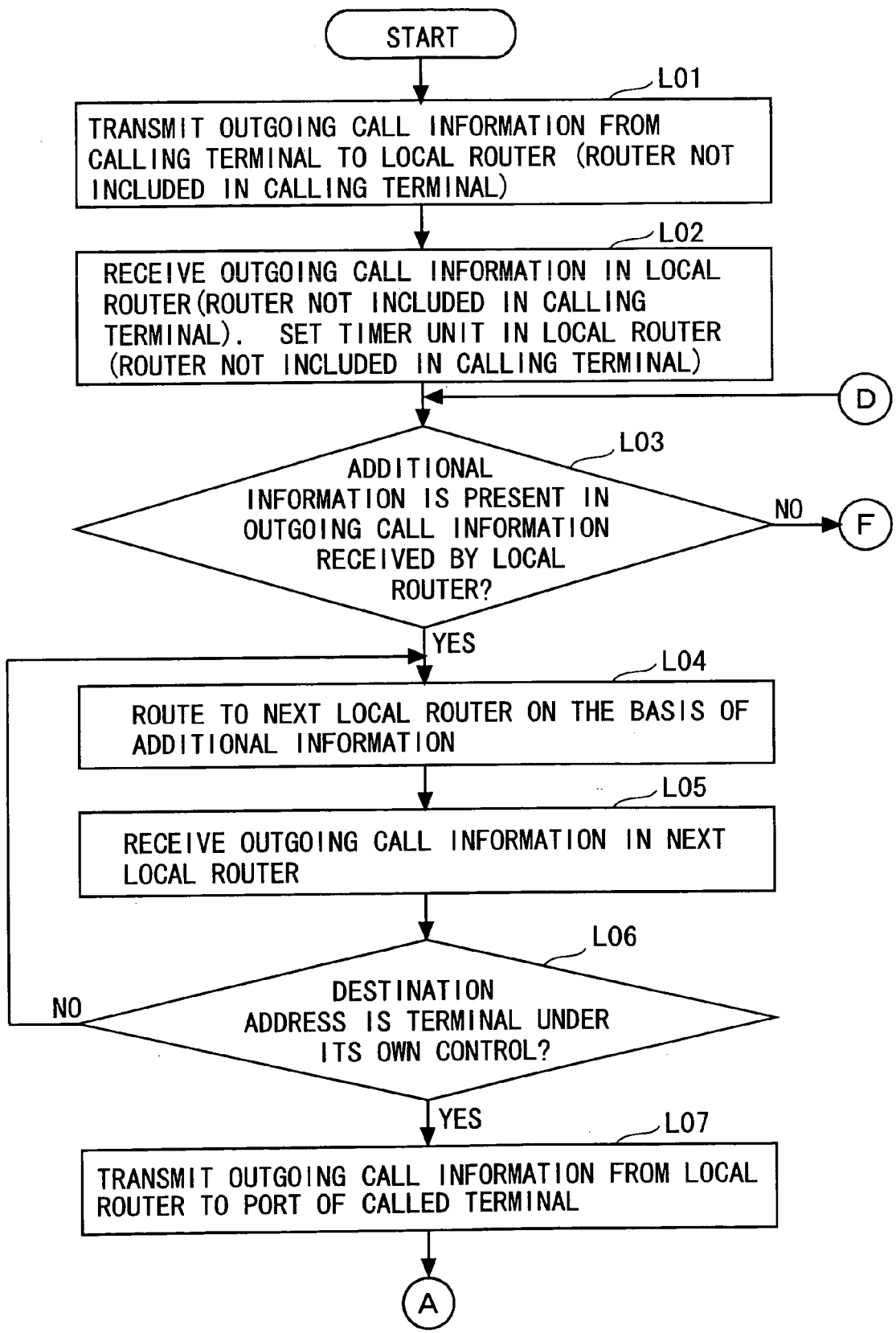
FIG. 3 is a flowchart showing processing of the local router.
Figure 4:
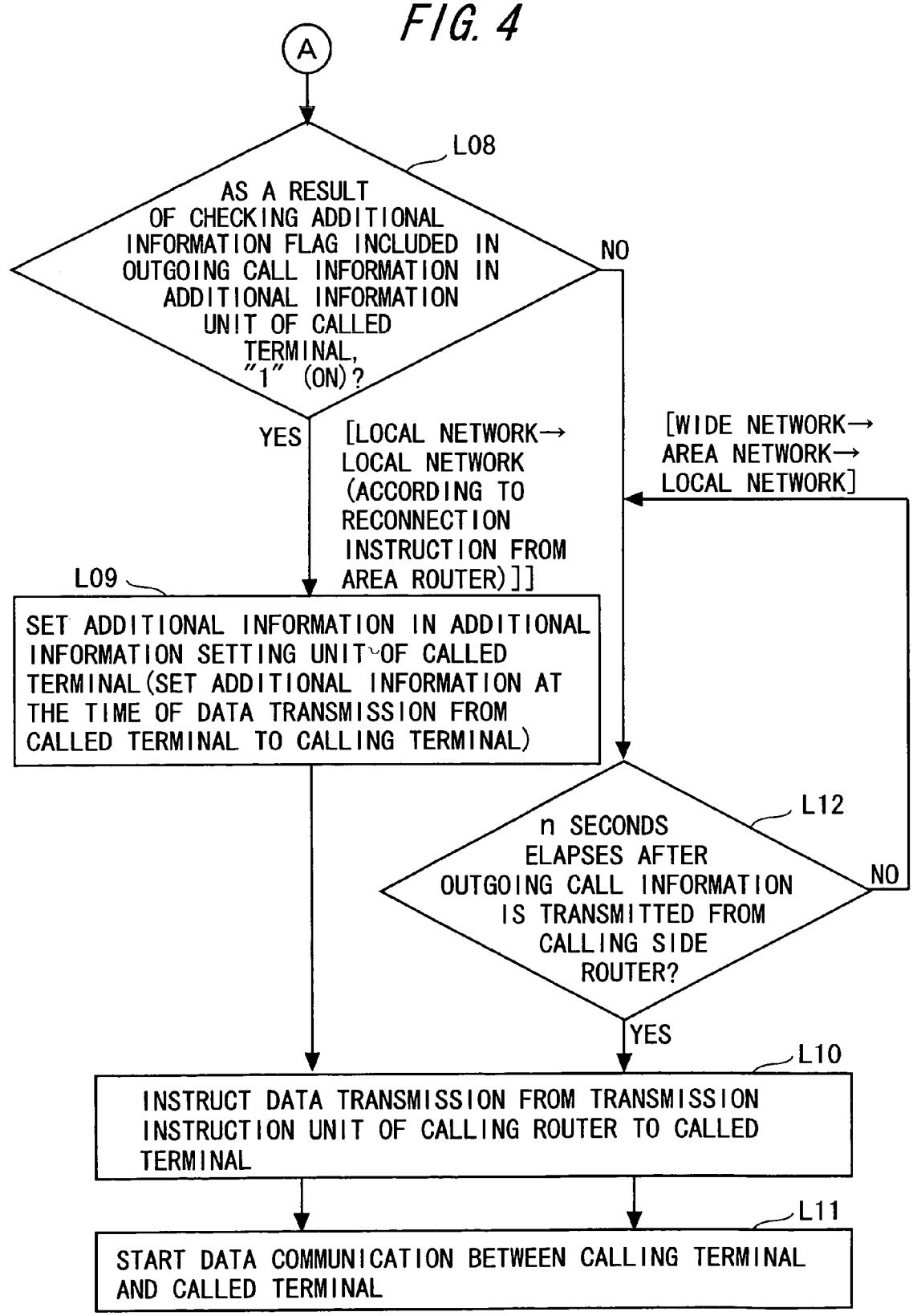
FIG. 4 is a flowchart showing the processing of the local router.
Figure 5:
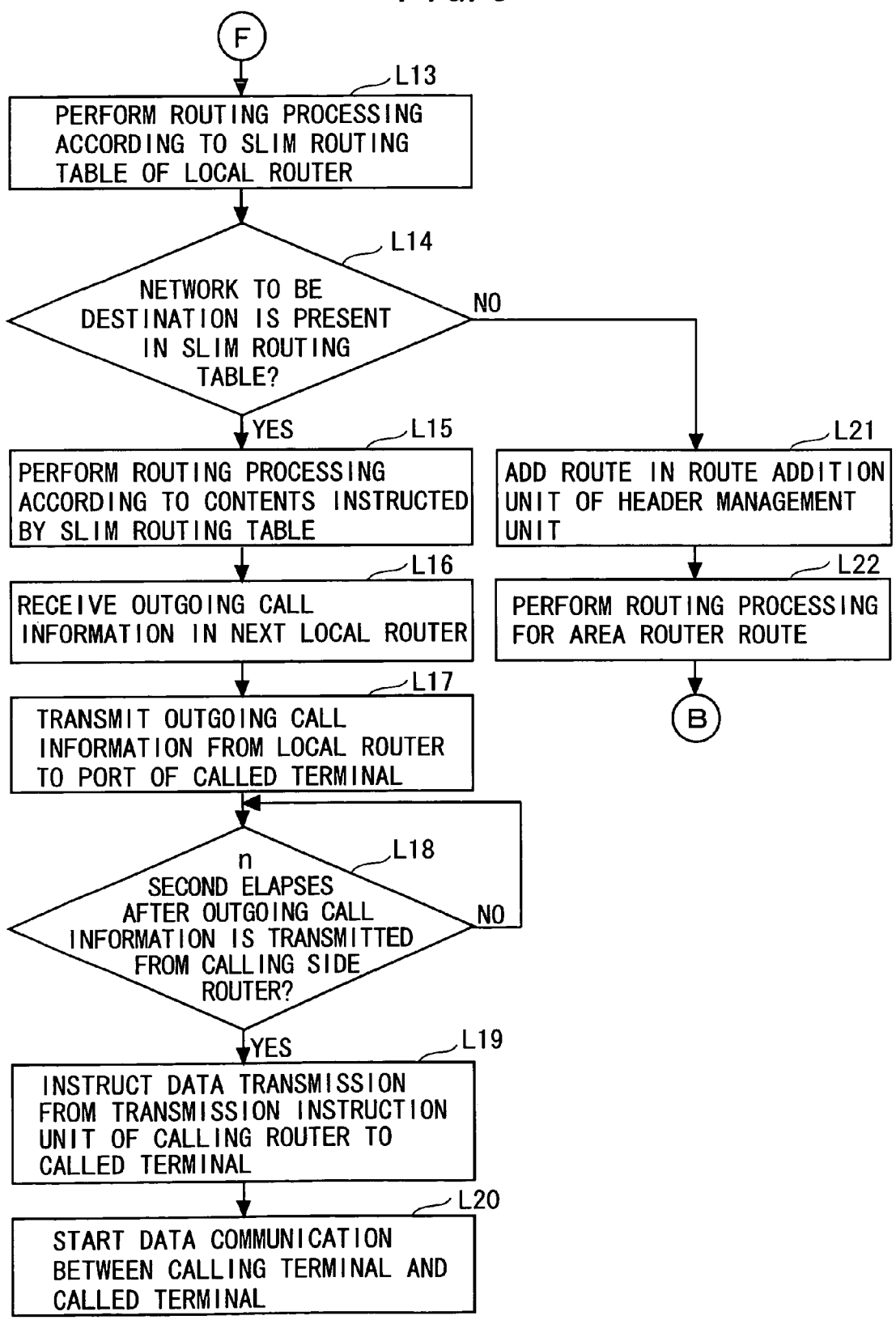
FIG. 5 is a flowchart showing the processing of the local router.
Figure 6:
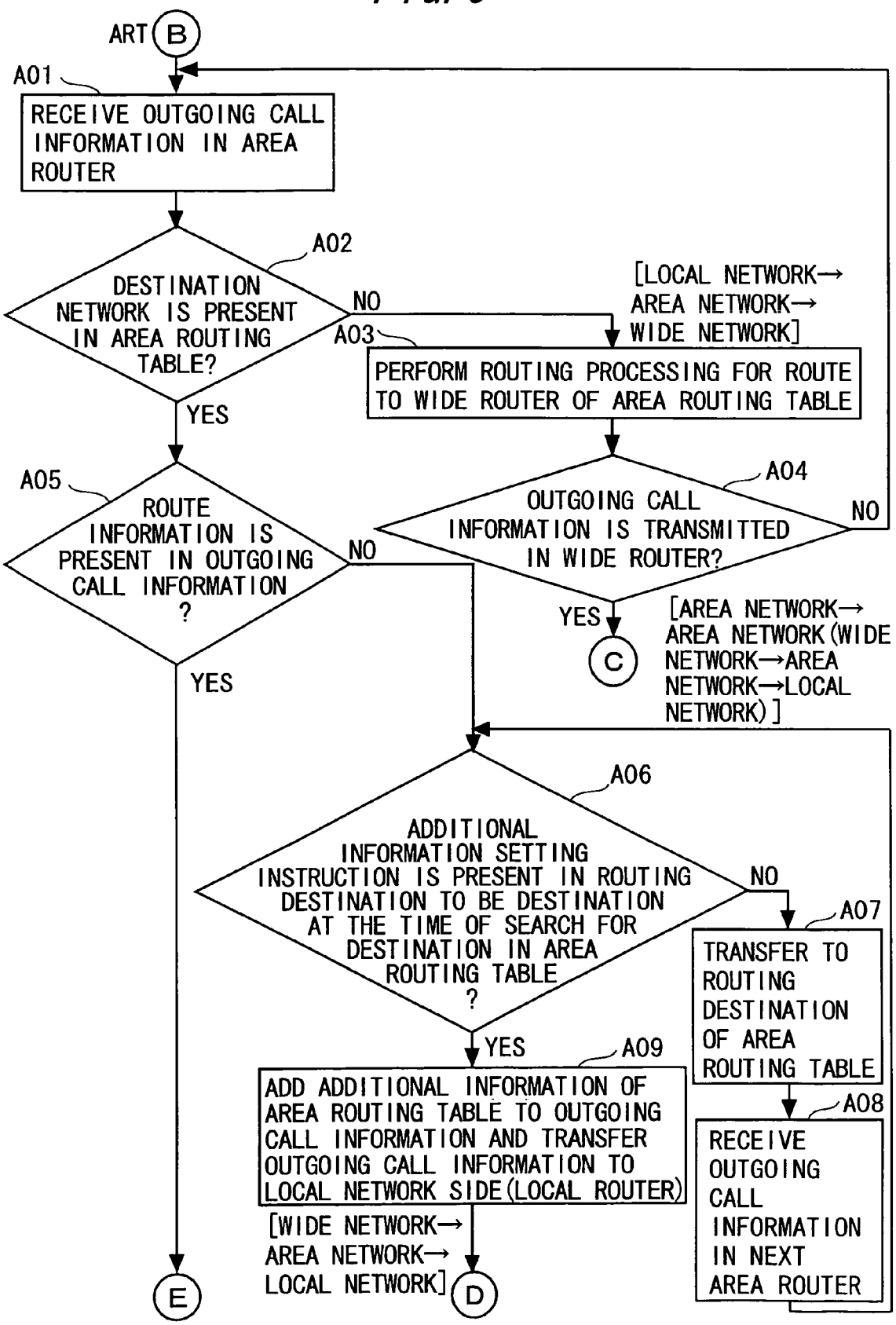
FIG. 6 is a flowchart showing processing of the area router.
Figure 7:
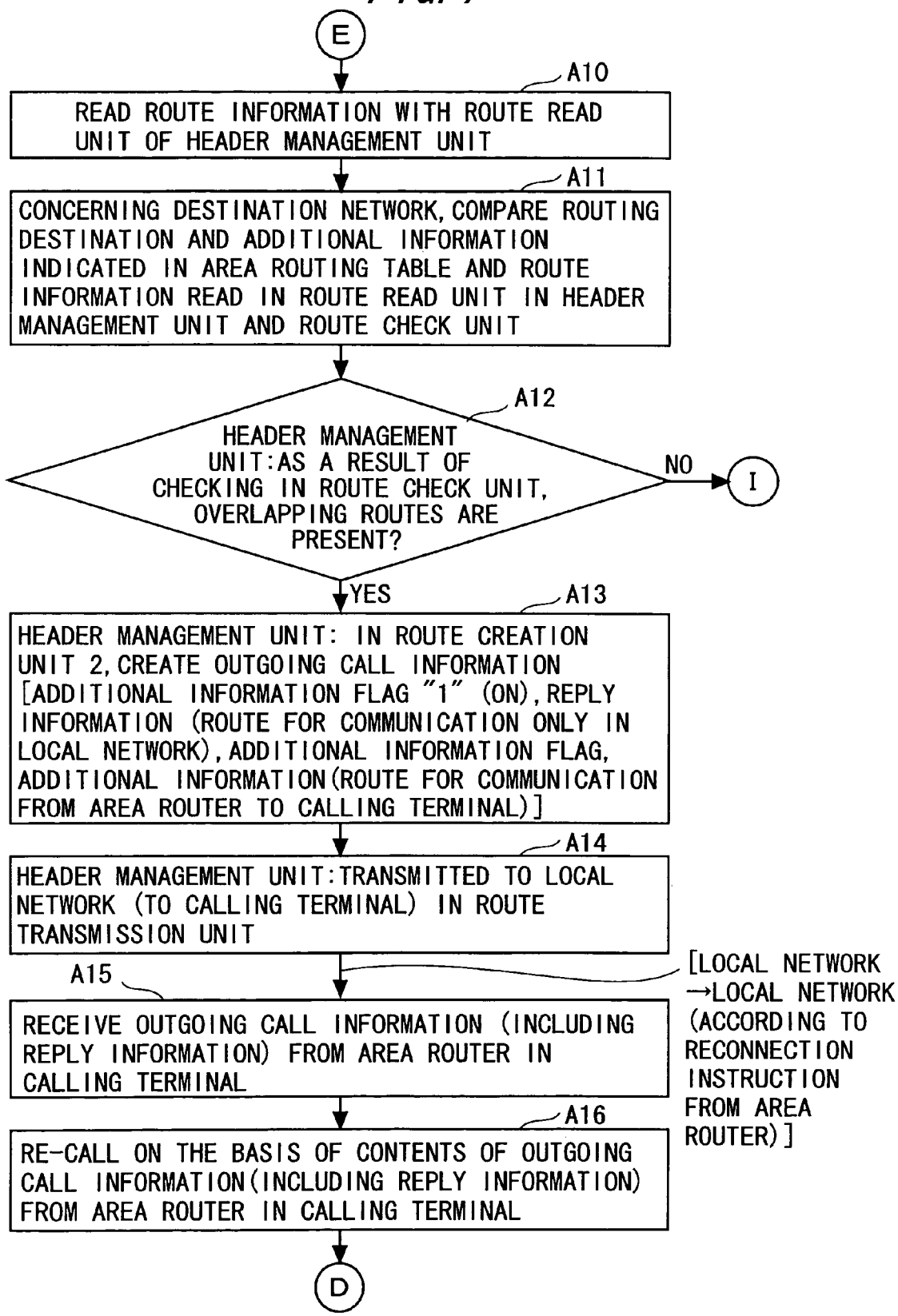
FIG. 7 is a flowchart showing the processing of the area router.
Figure 8:
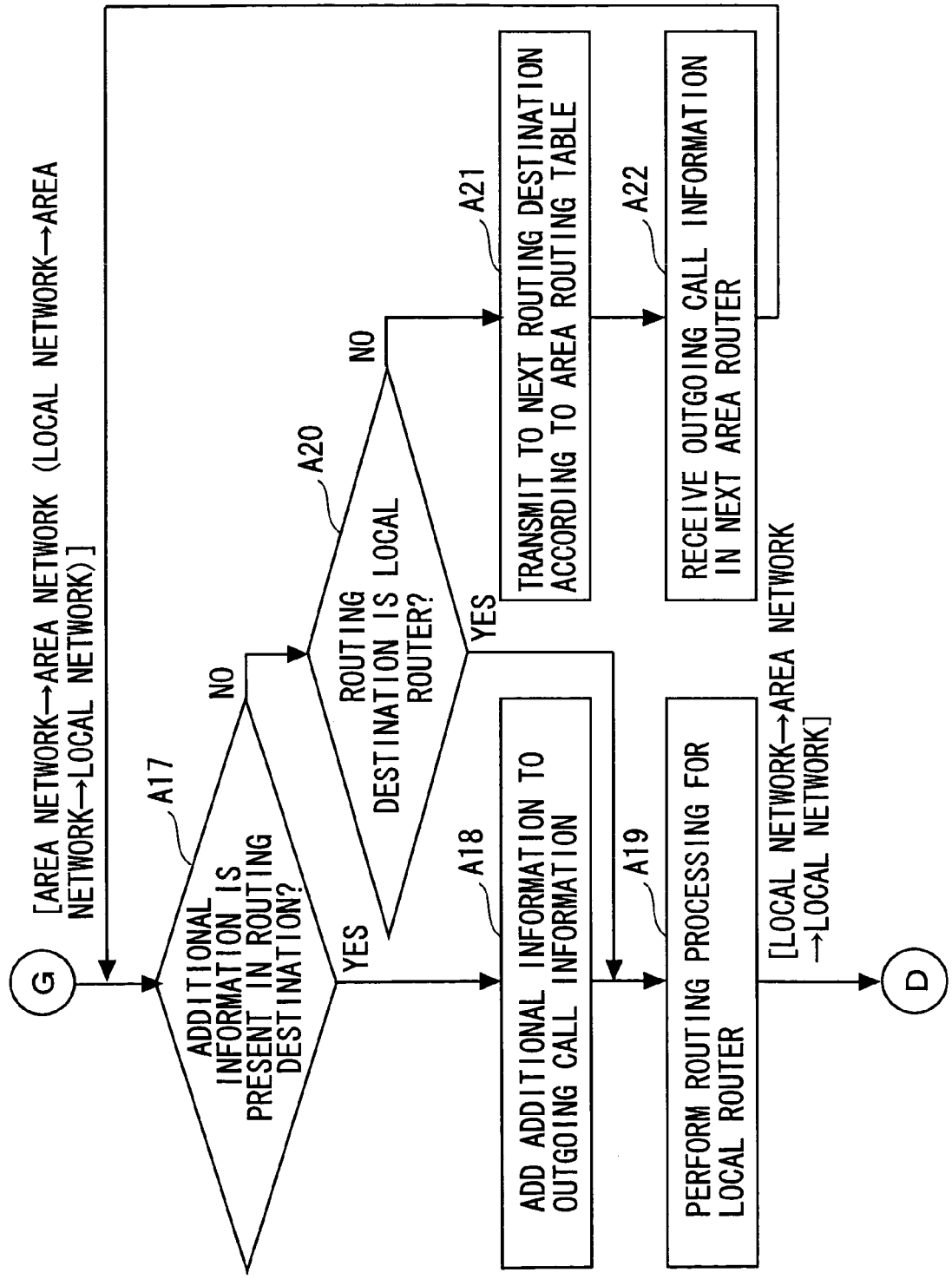
FIG. 8 is a flowchart showing the processing of the area router.
Figure 9:
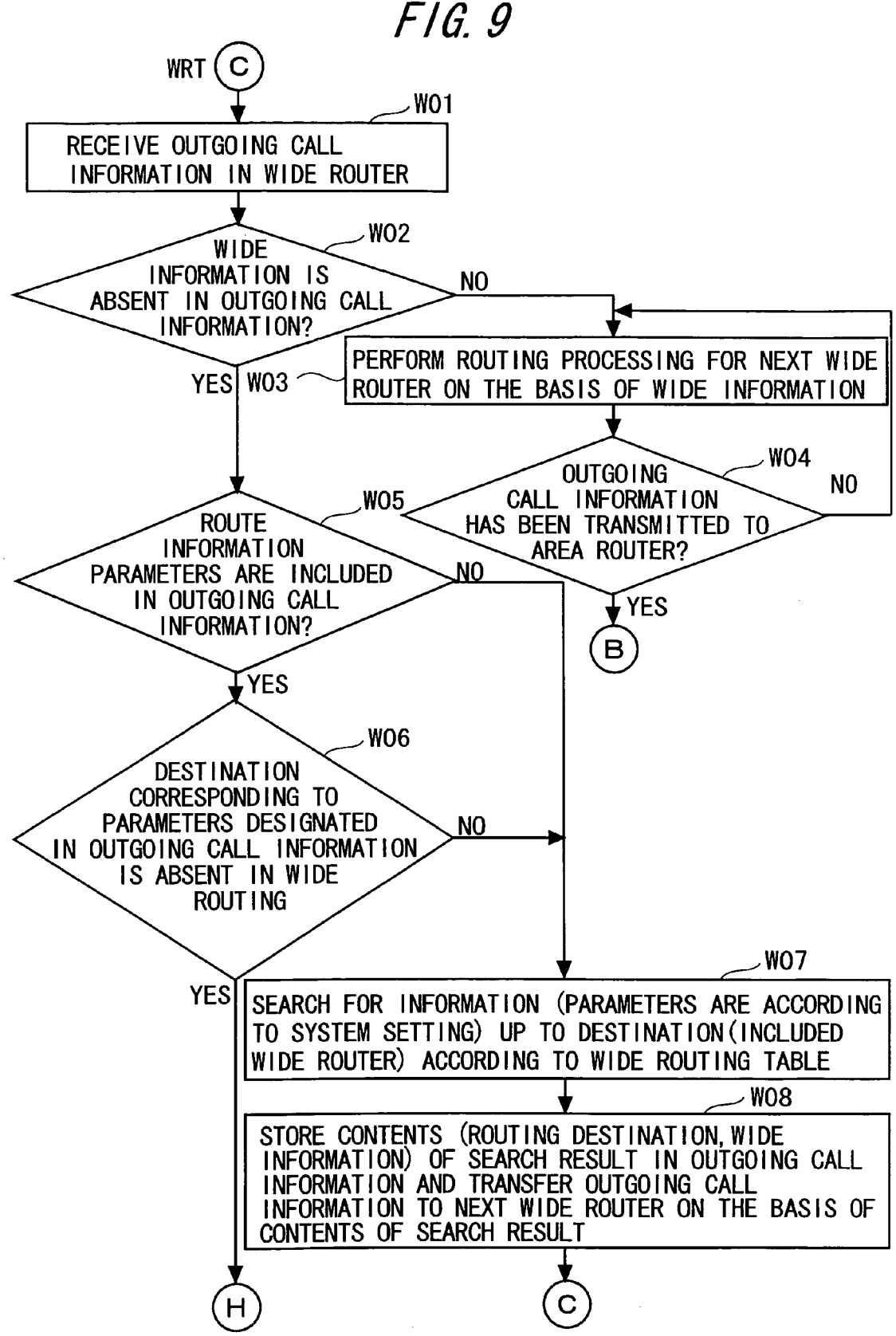
FIG. 9 is a flowchart showing processing of the wide router.
Figure 10:
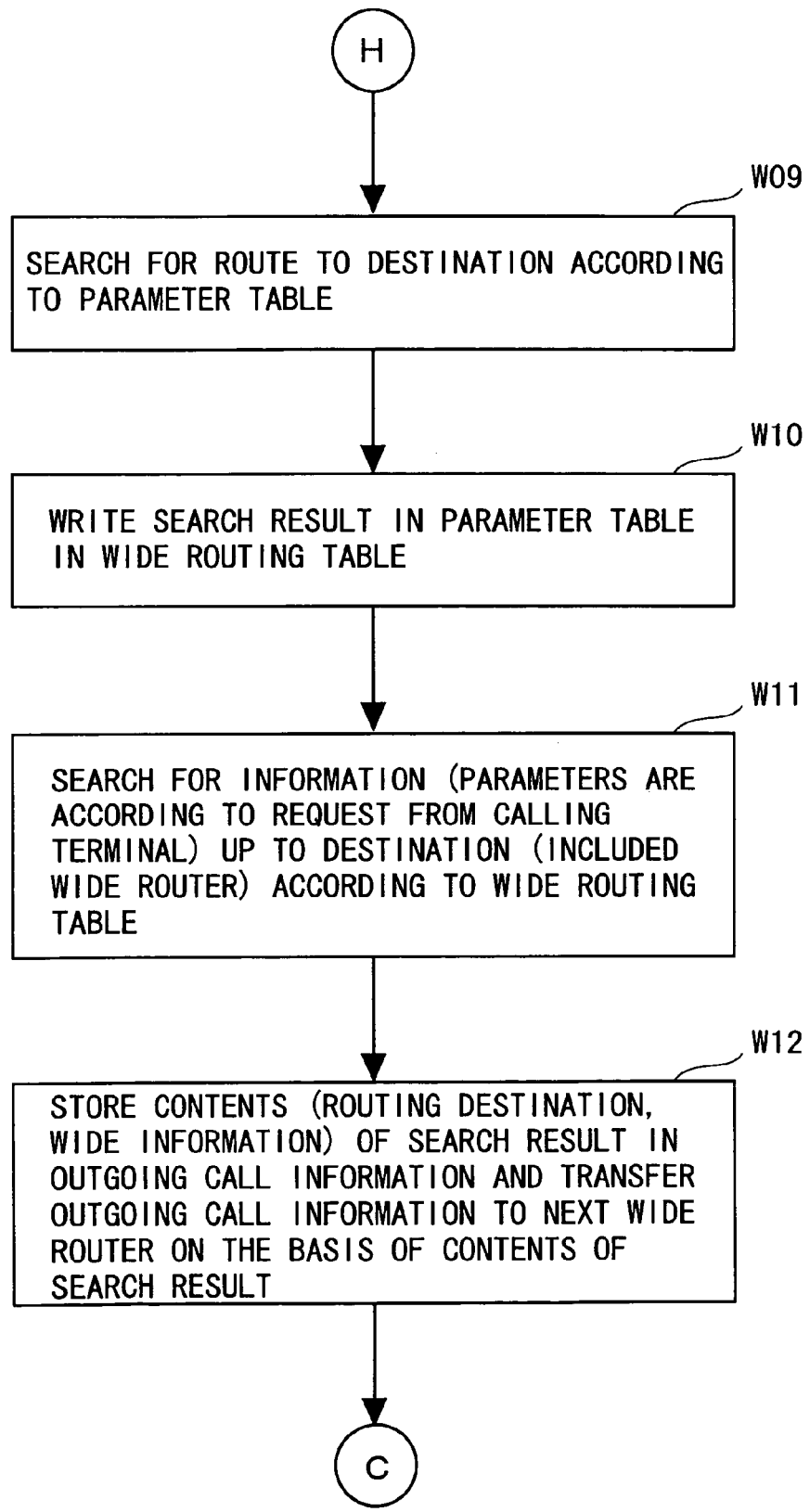
FIG. 10 is a flowchart showing the processing of the wide router.
Figure 11:
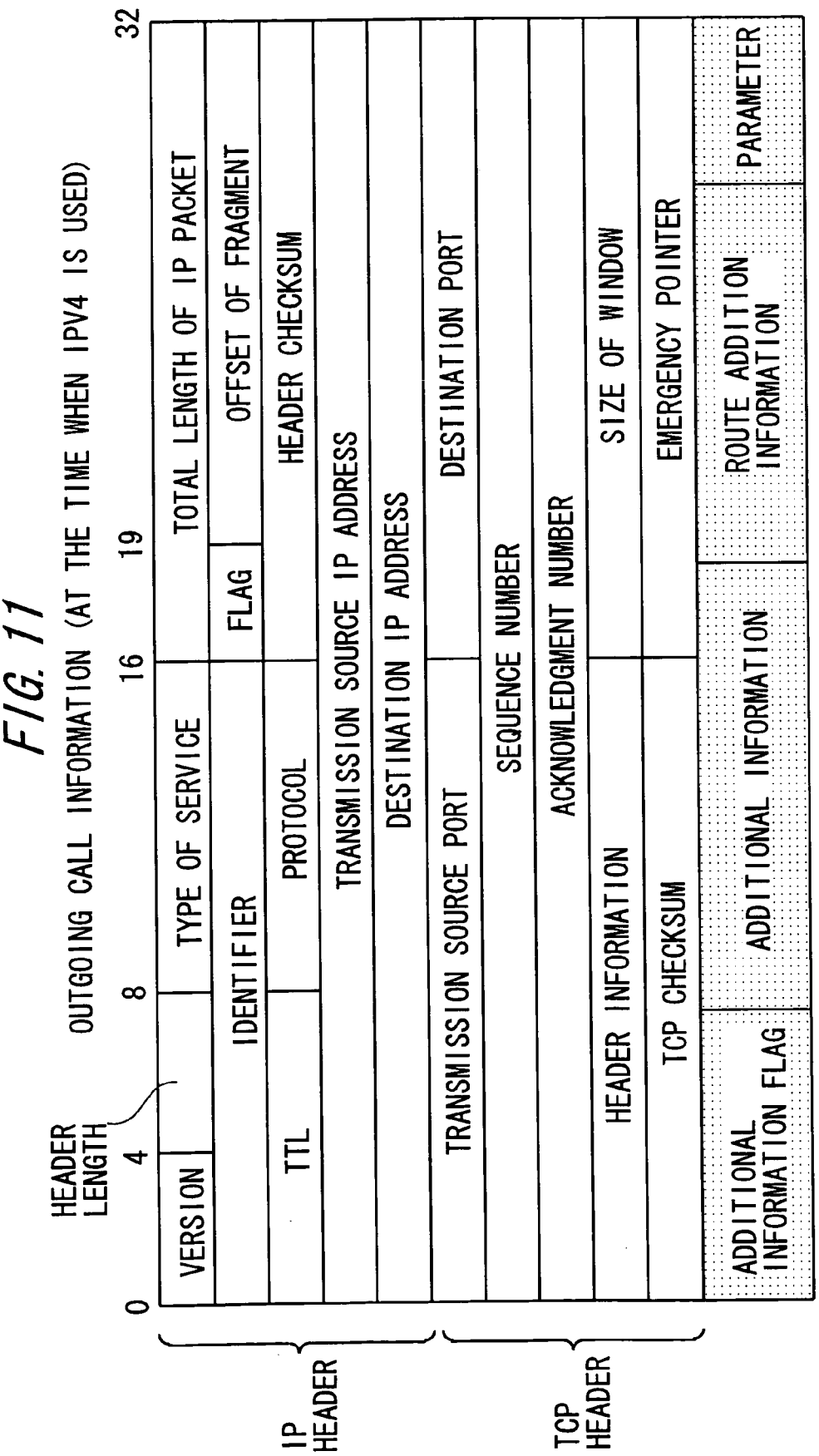
FIG. 11 shows a format of outgoing call information in each operation example.
Figure 12:
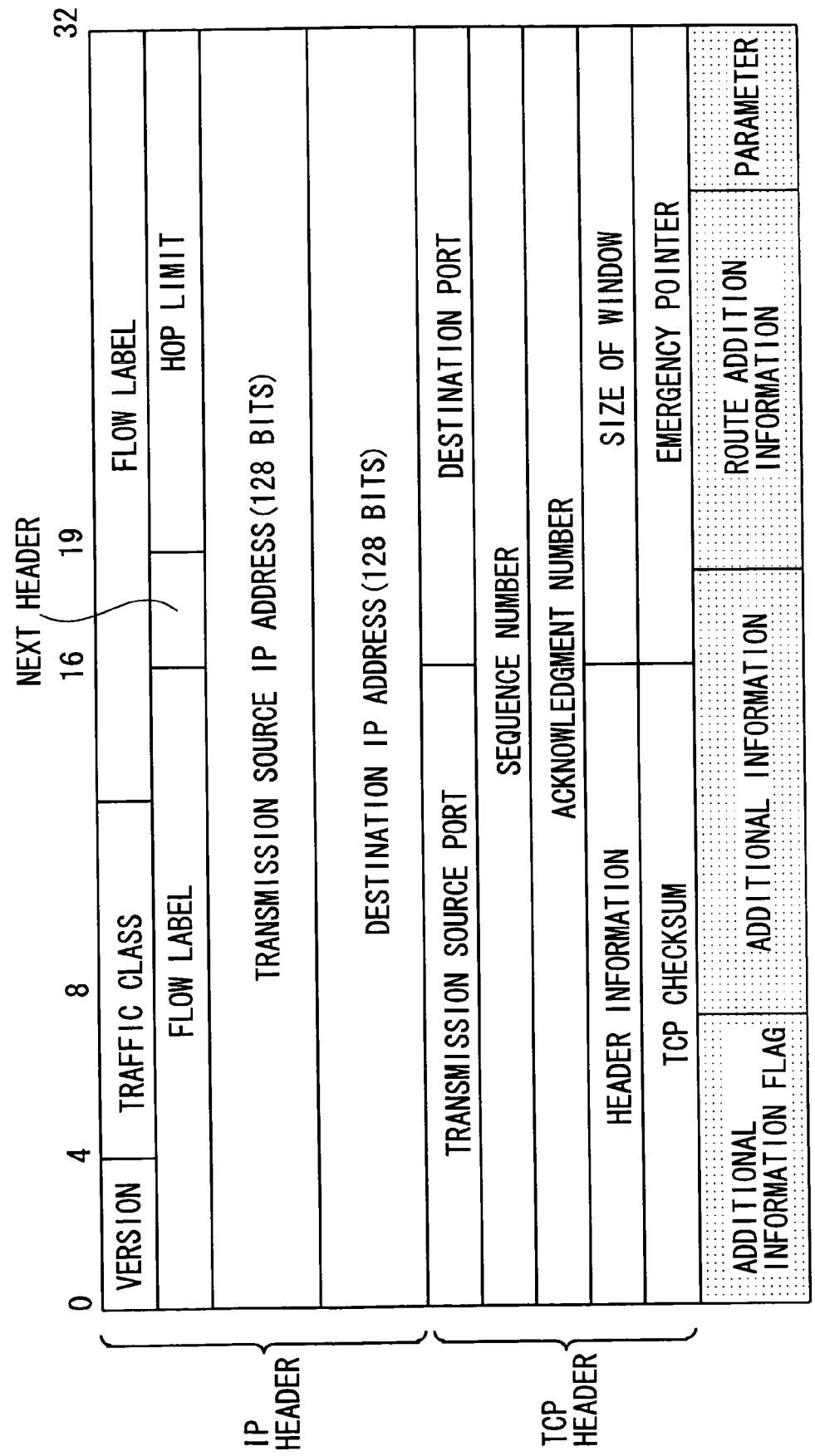
FIG. 12 shows a format of outgoing call information in each operation example.
Figure 15:
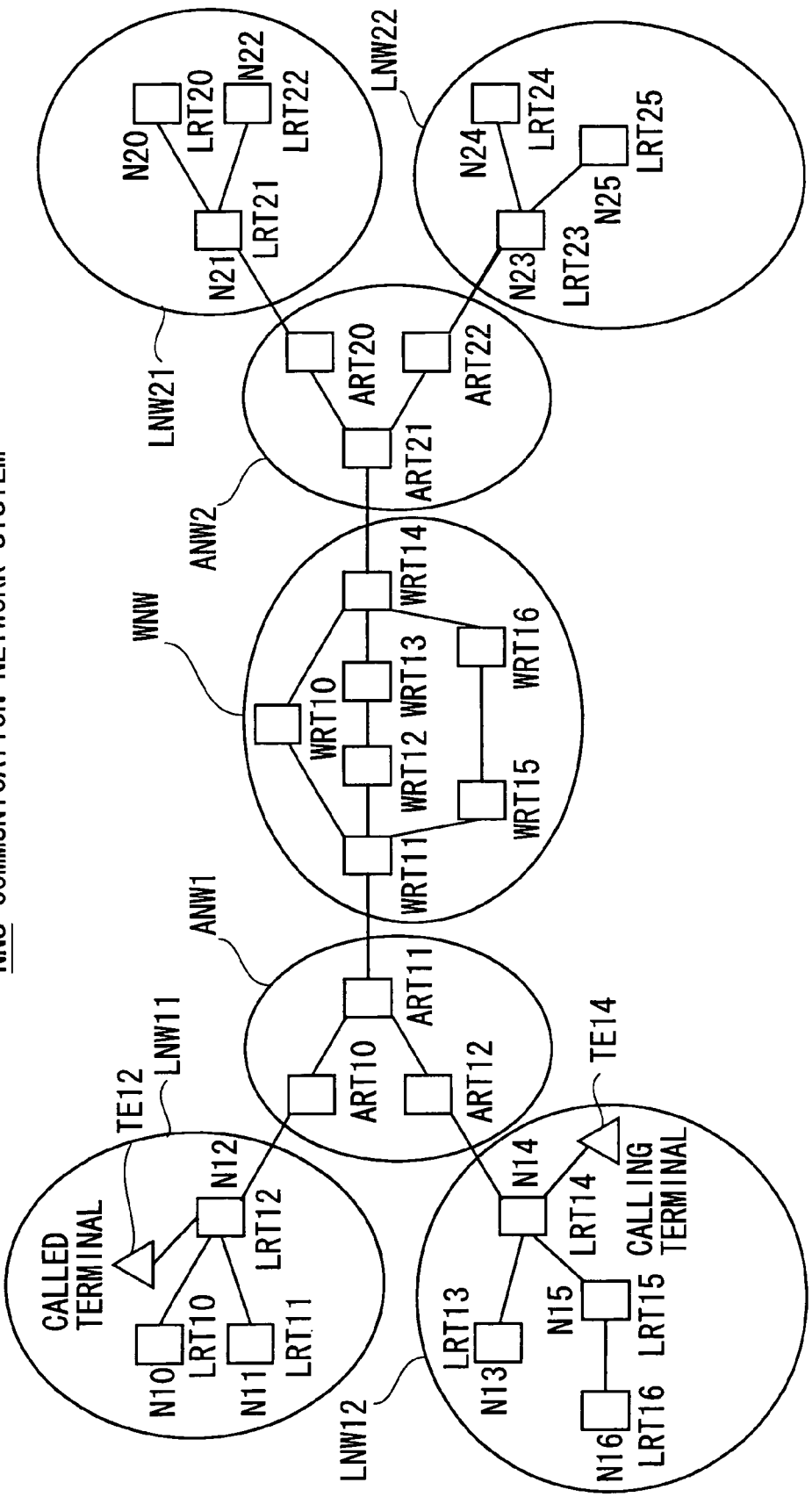
FIG. 15 is a diagram for explaining a structure and a second operation example of a communication network system according to an embodiment of the present invention.

FIGS. 3, 4, and 5 show processing (L01 to L22) of the local router LRT in the respective operation examples. FIGS. 6, 7, and 8 show processing (A01 to A22) of the area router ART in the respective operation examples. In addition, FIGS. 9 and 10 show processing (W01 to W12) of the wide router WRT in the respective operation examples.

[First Operation Example]

A first operation example in the communication network system NNS described above will be explained with reference to FIGS. 1 to 5 and FIGS. 11 to 14.

The first operation example is in a case in which a communication form for routing from the local router LRT15 to the adjacent local router LRT14 in one local network LNW12 and a communication route is the calling terminal TE15 the local router LRT 15 (included in the calling terminal) the local router LRT14 (included in the called terminal) the called terminal TE14.

Note that control of operations described here is carried out by the control units 113 and 213 in the respective local routers LRTs and the area router ART12 in cooperation with the elements such as the routing table creation units 115 and 215 and the header analysis units 117 and 216. However, explanations of the elements will be omitted unless any specific limitation on the elements is required.

In the local network LNW12, the calling terminal TE15 performs an outgoing call request by transmitting outgoing call information to the local router LRT15. The outgoing call information transmitted from the calling terminal TE15 has contents shown in FIG. 11 when the outgoing call information conforms to a protocol IPv4 and has contents shown in FIG. 12 when the outgoing call information conforms to a protocol IPv6. As is evident from FIGS. 11 and 12, the outgoing call information includes IP header information and TCP (Transmission Control Protocol) header information in a header portion of a frame thereof and has areas for setting an additional information flag, additional information, route addition information, and parameters in a free-use area of the header portion.

In the local router LRT15, the header analysis unit 117 confirms contents of the additional information flag (ON="1" or OFF="0") included in the outgoing call information from the calling terminal TE15. When the contents of the additional information flag is "1" indicating that there is additional information, the control unit 113 transfers the outgoing call information to the next route indicated by the additional information.

In addition, when the contents of the additional information flag is "0" indicating that there is no additional information, the control unit 113 judges how the received outgoing call information should be processed with reference to the slim routing table 112 of the local router LRT15 shown in FIG. 13. The control unit 113 confirms a network (sub-network) indicated by a destination IP address of an IP header in the header portion of the outgoing call information and confirms whether the network belongs to (is set in) the slim routing table 112 as a destination.

In this example, since the calling terminal TE15 transmits the outgoing call information to the called terminal TE14 of the network N14, a destination of the outgoing call information indicates the "network N14". In the local router LRT15, when the control unit 13 refers to the slim routing table 112, the control unit 113 recognizes that a routing destination of the destination "N14" is not present in the table 112.

Therefore, the outgoing call information received from the calling terminal TE15 is transmitted to the local router LRT14 as a routing destination corresponding to a destination "others" in the table 112. In that case, in the local router LRT15, route addition information "local router LRT15" is stored (set) as a route, through which the outgoing call information is transmitted, in the route addition information area in the outgoing call information according to the function of the route addition unit 1161 of the header management unit 116.

Note that, for any local router LRT in the respective local networks LNWs, a routing destination corresponding to the destination "others" in the slim routing table 112 is set in a route to the area router ART.

In the local router LRT14, the control unit 113 judges how the outgoing call information received from the local router LRT15 should be processed with reference to the area routing table 112 shown in FIG. 14.

First, in cooperation with the header analysis unit 117, the control unit 113 confirms a destination (a destination IP address of an IP header) of the outgoing call information with reference to the slim routing table 112 shown in FIG. 14 and confirms whether the destination is the control unit 113 itself (its own router), that is, the terminal TE14 included in the local router LRT14. If this destination is the terminal TE14 included in the local router LRT14, the control unit 13 transmits the outgoing call information to a destination port corresponding to the destination IP address.

When the destination is not the control unit 113, that is, the terminal TE14 included in the local router LRT14, the control unit 113 confirms presence or absence of additional information included in a header portion of the outgoing call information on the basis of the additional information flag in cooperation with the header analysis unit 117. Then, when there is additional information, the control unit 113 performs routing processing with contents indicated by the additional information. When there is no additional information, the control unit 113 performs routing processing with reference to the slim routing table 112.

In this example, since the called terminal TE14 is included in the network N14, the local router LRT14 transmits the outgoing call information to a destination port corresponding to the IP address of the received outgoing call information.

In the local router LRT15 including the calling terminal TE15, the control unit 113 transmits a communication possible message to the calling terminal TE15 after time decided in advance in the timer unit 118 elapses. Here, as described later, since it is likely that reply information is received from the area router ART in communication to be routed in the local network LNW at the time of a reconnection request from the area network ANW to the local network LNW, the time decided in advance is equivalent to time sufficient for receiving the reply information.

The calling terminal TE15 having received the communication possible message from the local router LRT15 starts transmission of data (a data packet). In the local router LRT15, the control unit 113 confirms presence or absence of additional information in a header portion in the data packet sent from the calling terminal TE15 on the basis of an additional information flag in cooperation with the header analysis unit 117. When there is additional information, the control unit 113 performs routing processing in accordance with a route indicated by the additional information. In addition, where there is no additional information, the control unit 113 performs routing processing with reference to the slim routing table 112 held by the local router LRT15.

In this example, since there is no additional information, as a result of referring to the slim routing table 112 (FIG. 13), the destination "N14" is "others", and the local router LRT15 transmits the data packet to the local router LRT14 corresponding to a route to the area router ART.

In the local router LRT14, as in the local router LRT15, the control unit 113 confirms presence or absence of additional information in a data packet to be sent. When there is additional information, the control unit 113 performs routing processing in a route indicated by the additional information. When there is no additional information, the control unit 113 performs routing processing with reference to the slim routing table 112 held by the local router LRT14.

In this example, since there is no receiving additional information in the local router LRT14, the local router LRT14 performs routing processing with reference to the slim routing table 112 (FIG. 14). As a result, the destination "N14" is "own router", and the control unit 113 performs data transfer to a destination port corresponding to the called terminal TE14 under the control of the local router LRT14.

[Second Operation Example]

A second operation example in the communication network system NNS described above will be explained with reference to FIGS. 2 to 8, FIG. 11, FIG. 12, and FIGS. 15 to 20.

The second operation example is in a case in which a communication form for performing routing between the local networks LNW11 and LNW12 with the intervention of the area network ANW1 is adopted and a communication route is the calling terminal TE14 the local network LNW12 (included in the calling terminal) the area network ANW1 the local network LNW11 (included in the called terminal) the called terminal TE12.

Note that control of operations described here is carried out by the control units 113 and 213 in the respective local routers LRTs and the area router ART12 in cooperation with the elements such as the routing table creation units 115 and 215 and the header analysis units 117 and 216. However, explanations of the elements will be omitted unless any specific limitation on the elements is required.

In the local network LNW12, the calling terminal TE14 performs an outgoing call request by transmitting outgoing call information to the local router LRT14. The outgoing call information transmitted from the calling terminal TE14 has contents shown in FIGS. 11 and 12 similar to the first operation example.

In the local router LRT14, the header analysis unit 116 confirms contents of the additional information flag (ON="1" or OFF="0") included in the outgoing call information from the calling terminal TE14. When the contents of the additional information flag is "1" indicating that there is additional information, the control unit 113 transfers the outgoing call information to the next route indicated by the additional information.

In addition, when the contents of the additional information flag is "0" indicating that there is no additional information, the control unit 113 judges how the received outgoing call information should be processed with reference to the slim routing table 112 of the local router LRT14 shown in FIG. 16. The control unit 113 confirms a network (sub-network) indicated by a destination IP address of an IP header in the header portion of the outgoing call information and confirms whether the network belongs to (is set in) the slim routing table 112 as a destination.

In this example, since the calling terminal TE14 transmits the outgoing call information to the called terminal TE12 of the network N12 in the local network LNW11, a destination of the outgoing call information indicates the "network N12". In the local router LRT14, when the control unit 13 refers to the slim routing table 112, the control unit 113 recognizes that a routing destination of the destination "N12" is not present in the table 112.

Therefore, the outgoing call information received from the calling terminal TE14 is transmitted to the area router ART12 as a routing destination corresponding to a destination "others" in the table 112. In that case, in the local router LRT14, route addition information "local router LRT14" is stored as a route, through which the outgoing call information is transmitted, in the route addition information area in the outgoing call information according to the function of the route addition unit 1161 of the header management unit 116.

Note that, for any local router LRT in the respective local network LNW, a routing destination corresponding to the destination "others" in the slim routing table 112 is set in a route to the area router ART.

In the area router ART12, the control unit 213 judges how the outgoing call-information received from the local router LRT14 should be processed with reference to the area routing table 212 shown in FIG. 17. In cooperation with the header analysis unit 216, first, the control unit 213 confirms a network indicated by the destination IP address of the IP header in the header portion of the outgoing call information and confirms whether there is a corresponding routing destination in the area routing table 212. When there is no corresponding routing destination, the control unit 213 transfers the outgoing call information to the area router ART corresponding to a route to the wide router WRT indicated by the destination "others".

In this example, since the destination IP address of the IP header is the network "N12" and the routing destination is the area router ART11, the area router ART12 transfers the outgoing call information to the area router ART11. At this point, the route information deletion unit 2176 of the header management unit 217 in the area router ART12 deletes the route information (route addition information) "local router LRT14" set in the route addition information area of the header portion of the outgoing call information received from the local router LRT14.

Here, in the area router ART12, as a result of referring to the area routing table 212 (FIG. 17), when routing destinations are the local routers LRT13, LRT14, LT15, and LRT16 under the control of the area router ART12, the route check unit 2173 of the header management unit 217 confirms that there is no overlap of routes. In that case, the route addition information is required in order to recognize in what kinds of routes the routing reaches the area router ART12.

When overlap of routes is confirmed by the route check unit 2173, in other words, when it is judged that the local routers LRTs are capable of communicating with one another even without passing the area router ART12, the area router ART creates reply information, in which route addition information and the additional information flag "1" among the local routers LRTs are set, with the second route creation unit 2172 of the header management unit 217 and further adds the created reply information to the outgoing call information to the calling terminal TE14 and transmits the outgoing call information according to the function of the route transmission unit 2174 of the header management unit 217.

In the area router ART11 having received the outgoing call information from the area router ART12, the control unit 213 judges how the outgoing call information corresponding to the outgoing call request from the area router ART12 should be processed with reference to the area routing table 212 shown in FIG. 18.

In the area router ART11, in cooperation with the header analysis unit 216, the control unit 213 confirms a network indicated by the destination IP address of the IP header in the header portion of the outgoing call information and confirms whether there is a corresponding routing destination in the area routing table 212 (FIG. 18). If there is no corresponding routing destination, the control unit 213 transfers the outgoing call information to a route to the wide router WRT corresponding to a routing destination indicated by the destination "others" in the area routing table 212.

In this example, since the destination IP address of the IP header in the outgoing call information is the network "N12" and the routing destination is the "area router ART10", the area router ART11 transfers the outgoing call information to the area router ART10.

In the area router ART10, the control unit 213 judges how the outgoing call information corresponding to the outgoing call request received from the area router ART11 should be processed with reference to the area routing table 212 shown in FIG. 19.

In the area router ART10, in cooperation with the header analysis unit 216, the control unit 213 confirms a network indicated by the destination IP address of the IP header in the header portion of the outgoing call information and confirms whether there is a corresponding routing destination in the area routing table 212. If there is no corresponding routing destination, the control unit 213 transfers the outgoing call information to a route to the wide router WRT corresponding to a routing destination indicated by the destination "others" in the area routing table 212.

In this example, since the destination IP address of the IP header in the outgoing call information is the network "N12" and the routing destination is the "local router LRT12", the area router ART10 transfers the outgoing call information to the local router LRT12.

At this point, in the area router ART10, the control unit 213 creates additional information, which indicates a transfer route in the local network LNW11 on the called side and the additional information flag "0", for the called terminal TE12 with the first route creation unit 2171 of the header management unit 217. Moreover, the route transmission unit 2174 of the header management unit 217 transmits the outgoing call information, in which the additional information is added to the additional information area in the header unit of the outgoing call information, to the next router.

In this example, since the called local router LRT12 is adjacent to the area router ART10, there are no additional information flag and additional information. Note that, for example, when a destination is the network "N10", the additional information flag is "0" and the additional information is the "local router LRT10".

In the local router LRT12, the outgoing call information received from the area router ART10 is processed as follows with reference to the slim routing table 112 shown in FIG. 20.

First, in the local router LRT12, in cooperation with the header analysis unit 117, the control unit 113 confirms whether there is additional information in the additional information area in the header portion of the outgoing call information and, when there is no additional information, performs routing processing in a route indicated by the additional information. When there is no additional information, the control unit 113 performs routing processing with reference to the slim routing table 112.

In cooperation with the header analysis unit 117, the control unit 113 confirms whether there is a terminal addressed to the control unit 113 itself in the destination IP address of the IP header in the header portion of the outgoing call information with reference to the slim routing table 112 and, if there is a terminal included in the local router LRT12, the control unit 113 transmits the outgoing call information to a destination port corresponding to the destination IP address.

In this example, since the called terminal TE12 is a terminal included in the network N12, the local router LRT12 transmits the outgoing call information to a destination port corresponding to the IP address of the received outgoing call information.

In the local router LRT14 including the calling terminal TE14, the control unit 113 transmits a communication possible message to the calling terminal TE14 after the time decided in advance (n seconds) elapses. When the calling terminal TE14 receives this communication possible message, the calling terminal TE14 starts data (data packet) transmission. The local router LRT14 confirms presence or absence of additional information in a header portion of the data packet sent from the calling terminal TE14 and, when there is additional information, performs routing processing in a route indicated by the additional information. In addition, when there is no additional information, the control unit 113 performs routing processing with reference to the slim routing table 112 (FIG. 16) held by the local router LRT14. Note that, in the case of the data packet, route information is not added to the header portion in the local router LRT.

In this example, since there is no additional information in the data packet transmitted from the calling terminal TE14, as a result of referring to the slim routing table 112, the destination "N2" is the destination of "others". Thus, outgoing call information is transmitted to the area router ART corresponding to a route to area routers.

In the area routers ART12, ART11, and ART10 in the area network ANW1 to which the outgoing call information from the local router LRT14 is transmitted, the control units 213 apply routing processing to the local router LRT12 on the basis of the area routing tables 212 held by the respective area routers.

In the local router LRT12 having received the data packet, the control unit 113 confirms presence or absence of additional information in the data packet. When there is additional information, the control unit 113 performs routing processing in a route indicated by the additional information. When there is no additional information, the control unit 113 performs routing processing on the basis of the slim routing table 212 of the local router LRT12. In this example, since there is no additional information and, as a result of referring to the area routing table 212, the destination "N12" is a routing destination "own router", the local router LRT12 performs data transfer to a destination port corresponding to the called terminal TE12 under its control.

[Third Operation Example]

A third operation example in the communication network system NNS described above will be explained with reference to FIGS. 2 to 8, FIG. 11, FIG. 12, and FIGS. 21 to 26.

The third operation example is in a case in which a first communication form for performing routing in the local network LNW12 according to a reconnection request from the area network ANW1 to the local network LNW12 is adopted, a first communication route at the time of outgoing call is the calling terminal TE14 the local network LNW12 the area network ANW1 the local network LNW12, and a second communication route at the time of re-calling is the local router LRT14 (included in the calling terminal) the local network LNW12 the local router LRT16 (included in the called terminal).

Figure 21:
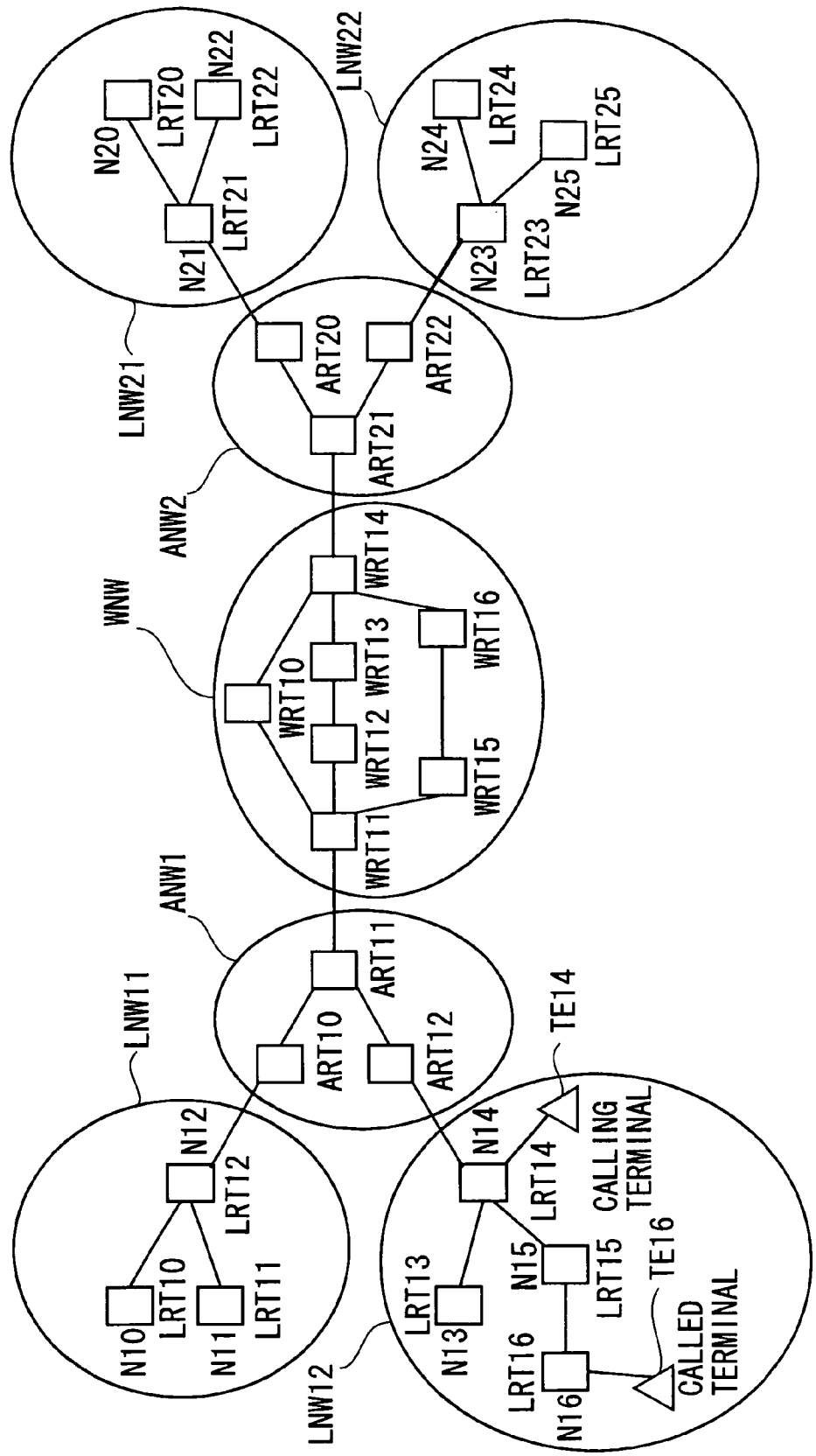
FIG. 21 is a diagram for explaining a structure and a third operation example of a communication network system according to an embodiment of the present invention.

More specifically, in a system structure shown in FIG. 21, the following communication route is adopted. In short, terminals and routers are connected in the following order: the calling terminal TE14 the local router LRT14 the area router ART12 (here, the area router ART12 transmits reply information for instructing the calling terminal TE14 about a connection route) the local router LRT14 the calling terminal TE14 (here, the calling terminal TE14 receives the reply information from the area router ART12, sets the instructed route in additional information area of a header portion of the reply information, and transmits the reply information to the local router LRT14) the local router LRT14 (here, the local router LRT14 transmits outgoing call information to the local router LRT15 with reference to additional information included in a header portion of outgoing call information from the calling terminal TE14) the local router LRT15 (here, the local router LRT15 transmits the outgoing call information to the local router LRT16 with reference to the additional information of the outgoing call information) the local router LRT16 (the local router LRT16 instructs the called terminal TE16 about route information as a route at the time when there is a reply) the called terminal TE16.

Note that control of operations described here is carried out by the control units 113 and 213 in the respective local routers LRTs and the area router ART12 in cooperation with the elements such as the routing table creation-units 115 and 215 and the header analysis units 117 and 216. However, explanations of the elements will be omitted unless any specific limitation on the elements is required.

In the local network LNW12, the calling terminal TE14 performs an outgoing call request by transmitting outgoing call information to the local router LRT14. The outgoing call information transmitted from the calling terminal TE14 has contents shown in FIGS. 11 and 12 similar to the first operation example.

In the local router LRT14, the header analysis unit 117 confirms contents of the additional information flag (ON="1" or OFF="0") included in the outgoing call information from the calling terminal TE14. When the contents of the additional information flag is "1" indicating that there is additional information, the control unit 113 transfers the outgoing call information to the next route indicated by the additional information.

In addition, when the contents of the additional information flag is "0" indicating that there is no additional information, the control unit 113 judges how the received outgoing call information should be processed with reference to the slim routing table 112 of the local router LRT14 shown in FIG. 22. The control unit 113 confirms a network (sub-network) indicated by a destination IP address of an IP header in the header portion of the outgoing call information and confirms whether the network belongs to the slim routing table 112 as a destination.

In this example, since the calling terminal TE14 transmits the outgoing call information to the called terminal TE16 of the network N16 in the local network LNW12, a destination of the outgoing call information indicates the "network N16". In the local router LRT14 when the control unit 113 refers to the slim routing table 112, the control unit 113 recognizes that a routing destination of the destination "N16" is not present in the table 112.

Therefore, the outgoing call information received from the calling terminal TE14 is transmitted to the area router ART12 as a routing destination corresponding to a destination "others" in the table 112. In that case, in the local router LRT14, route addition information "local router LRT14" is stored as a route, through which the outgoing call information is transmitted, in the route addition information area in the outgoing call information according to the function of the route addition unit 1161 of the header management unit 116.

In the area router ART12, the control unit 213 processes the outgoing call information received from the local router LRT14 with reference to the area routing table 212 shown in FIG. 23. In the area router ART12, first, the control unit 213 confirms a network indicated by the destination IP address of the IP header in the header portion of the outgoing call information in cooperation with the header analysis unit 216.

Consequently, the control unit 213 confirms whether a corresponding destination (network) is present in the area routing table 212. When there is no corresponding destination, the control unit 213 transfers the outgoing call information to a route to the wide router WRT corresponding to the routing destination "area router ART11" indicated by the destination "others".

In this example, since the destination "N16" is present in the area routing table 212, there is a corresponding routing destination. In other words, the destination IP address is "NN16", the routing destination is the "local router LRT14", and the additional information is the "local router LRT15" and the "local router LRT16".

At this point, in the area router ART12, the route read unit 2175 of the header management unit 217 reads route information. In this example, the route read unit 2175 reads out the route addition information "local router LRT14" of the route addition information area included in the header portion of the outgoing call information. Then, the route read unit 2175 compares the routing destination "local router LRT14" and the routing destination addition information "local router LRT15, local router LRT16" indicated by the destination "N16" in the area routing table 212 and the route addition information "local router LRT14" included in the outgoing call information and confirms presence or absence of an overlapped portion.

The comparison and confirmation of this overlapped portion is as described below. In this case, in the area router ART12, as a result of comparing the routing destinations "the local router LRT14, the local router LRT15, and the local router LRT16" and the route addition information "local router LRT14", it is seen that the "local router LRT14" overlaps. In other words, it is seen that it is possible to make connection in the local network LNW12 even without passing the area router ART12.

Figure 24:
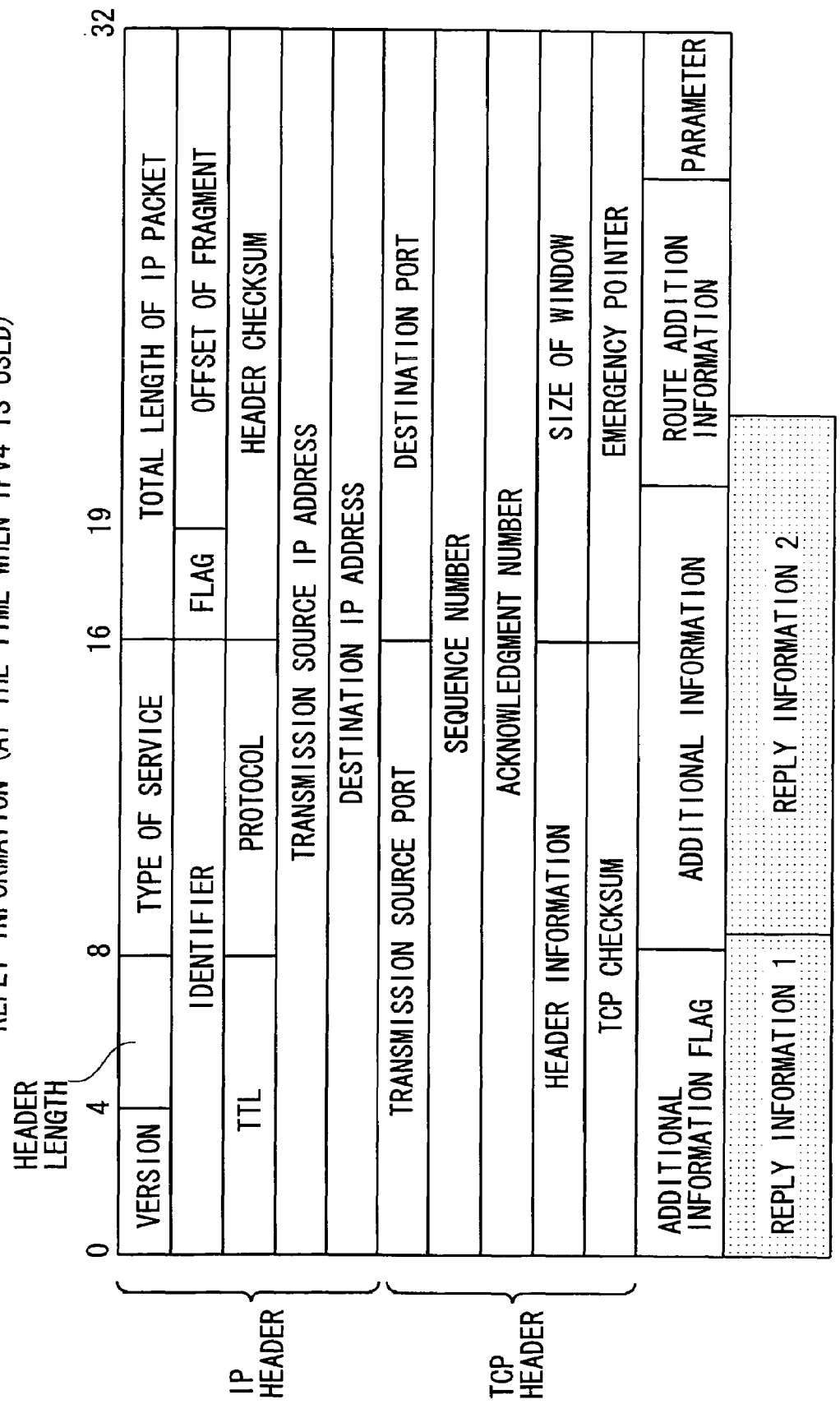
FIG. 24 shows a format of reply information in the third operation example.
Figure 25:
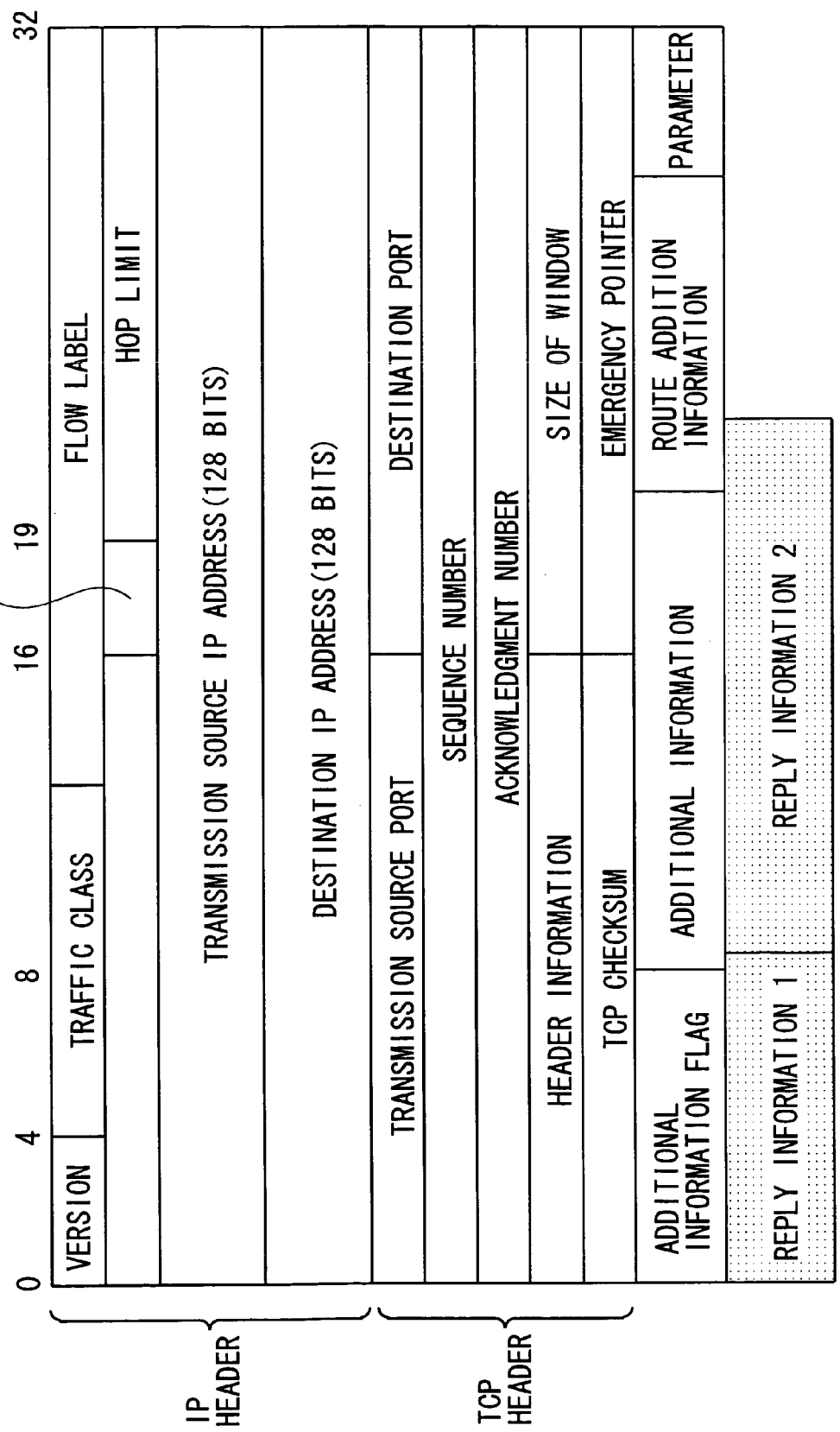
FIG. 25 shows a format of reply information in the third operation example.

In the area router ART12 that has judged that it is possible to make connection in the local network LNW12, for the calling terminal TE14, the second route creation unit 2172 of the header management unit 217 stores an additional information flag, which is required when the calling terminal TE14 re-calls, as "reply information 1" and stores additional information as "reply information 2" in a free-use area of a header portion of reply information shown in FIG. 24 or 25. FIG. 24 shows a format of reply information applicable to the protocol IPv4 and FIG. 25 shows a format of reply information applicable to the protocol IPv6.

In this example, since the additional information flag at the time when the calling terminal TE14 calls is "1" and the additional information is "the local router LRT14, the local router LRT15, and the local router LRT16", "1" is stored in a reply information section 1 and "the local router LRT14, the local router LRT15, and the local router LRT16" is stored in a reply information section 2. Note that the additional information flag included in the reply information is "0", the additional information is the "local router LRT14", and the route addition information is "none".

The route transmission unit 2174 of the header management unit 217 in the area router ART12 transmits the reply information to the calling terminal TE14. In this case, contents to be stored in the free-use area of the header portion as reply information are the additional information flag "0", the additional information the "local router LRT14", the route addition information "none", the reply information 1 "1", the reply information 2 "the local router LRT14, the local router LRT15,and the local router LRT16".

The route transmission unit 2174 of the header management unit 217 confirms the additional information "local router LRT14" of the reply information and transmits the reply information to the local router LRT14.

In the local router LRT14 having received the reply information, the control unit 113 confirms the additional information of the reply information in cooperation with the header analysis unit 117. However, since the contents is the "local router LRT14", the control unit.113 performs routing processing with reference to the slim routing table 112 (FIG. 22) held by the control unit 113 itself.

As a result of the reference to the slim routing table 112, since the destination "N14" is under the control of its own router, the control unit 13 transmits the reply information to a destination port (corresponding to the calling terminal TE14) indicated by the destination IP address.

In the calling terminal TE14 having received the reply information, the additional information read unit 410 reads the reply information 1 and the reply information 2 included in the header portion of the reply information. In the calling terminal TE14, the additional information setting unit 411 sets the contents of the reply information 1 and the reply information 2 read by the additional information read unit 410 in the outgoing call information as an additional information flag and additional information. In other words, in the calling terminal TE14, the additional information setting unit 411 sets the additional information flag "1" and the additional information "the local router LRT14, the local router LRT15, and the local router LRT16" in the outgoing call information and transmits the outgoing call information in the local router LRT14 again.

In the local router LRT14, the control unit 113 confirms presence or absence of additional information included in the outgoing call information from the calling terminal TE14. When there is additional information, the control unit 113 transfers the outgoing call information to the next route on the basis of contents indicated by the additional information. When there is no additional information, the control unit 113 performs routing processing with reference to the slim routing table 112 (FIG. 22).

In this example, since the additional information exists in the outgoing call information, in the local router LRT14, the control unit 113 performs routing processing on the basis of the additional information. In this case, since the contents of the additional information is "the local router LRT14, the local router LRT15, and the local router LRT16", in the local router LRT14, the control unit 113 performs transfer processing to the local router LRT15 as the next routing destination.

In the local router LRT15 having received the outgoing call information from the local router LRT14, as in the local router LRT14, the control unit 113 confirms whether there is additional information in the outgoing call information. In this case, since additional information is included in the outgoing call information, in the local router LRT15, the control unit 113 transfers the outgoing call information to the routing destination "local router LRT16" indicated in the additional information.

In the local router LRT16, as in the local routers LRT14 and LRT15, the control unit 113 confirms an additional information flag included in the outgoing call information. In this case, since additional information is included but additional information on or after the "local router LRT16" is not included, in the local router LRT16, the control unit 113 performs routing processing with reference to the slim routing table 112 held by the local router LRT16 itself shown in FIG. 26. In the local router LRT16, as a result of the reference to the slim routing table 112, since a routing destination indicated by the destination "N16" is "own router", the control unit 113 transmits the outgoing call information to a destination port (corresponding to the calling terminal TE16) indicated by a destination IP address.

In the called terminal TE16 having received the outgoing call information from the local router LRT16, the additional information read unit 410 reads the additional information flag and the additional information. When the additional information flag of the outgoing call information, which is transmitted from the calling terminal TE14 and received through the local router LRT16, is "1", the called terminal TE16 sets the additional information flag to "0" with the additional information setting unit 411 and sets additional information with an order of contents reversed from that at the time of reception.

For example, when the called terminal TE16 replies (transmits data) to the calling terminal TE14, the called terminal TE16 adds the contents set by the additional information setting unit 411, that is, the additional information flag "0" and additional information "the local router LRT16, the local router LRT15, and the local router LRT14" with an order of contents reversed from that at the time of reception to the data packet and performs data transmission. Note that, when the additional information flag transmitted from the outgoing terminal TE14 is "0", the called terminal TE16 does not perform the setting by the additional information setting unit 411.

According to the processing described above, the calling terminal TE14 sets the additional information flag and the additional information in the outgoing call information on the basis of the reply information from the area router ART12 and completes the transmission of the outgoing call information to the called terminal TE16. Thereafter, the calling terminal TE14 starts transmission of data (data packet) addressed to the called terminal TE16 to the local router LRT14.

In a data transfer process, in the local router LRT14, the control unit 113 confirms presence or absence of additional information of the data packet sent from the calling terminal TE14 and, when there is additional information, performs routing processing in a route indicated by the additional information. When there is no additional information, the control unit 113 performs routing processing with reference to the slim routing table 112 (FIG. 22) held by the local router LRT14.

In this example, since there is additional information, routing processing is performed on the basis of an instruction of the additional information, and the data packet is transferred to the local router LRT15. In the local router LRT15, the control unit 113 confirms presence or absence of additional information and, since there is additional information, transfers the outgoing call information to the routing destination "local router LRT16".

The local router LRT16 also confirms that there is additional information. However, since there is no additional information on or after the local router LRT16, the local router LRT16 performs routing processing with reference to the slim routing table 112 (FIG. 26) of the local router LRT16. In this case, since a routing destination indicated by the destination "N16" is "own router", in the local router LRT16, the control unit 113 performs data transfer to a destination port corresponding to the called terminal TE6 under the control of its own router.

[Fourth Operation Example]

A fourth operation example in the communication network system NNS described above will be explained with reference to FIGS. 2 to 12 and FIGS. 27 to 39.

The fourth operation example corresponds to a case in which a communication form for performing routing on the basis of parameters (system setting) set in the wide network WNW is adopted, and a communication route is the calling terminal TE14 the local router LRT14 the area network ANW1 the wide network WNW the area network ANW2 the local router LRT21 the local router LRT20 the called terminal TE20.

Figure 27:
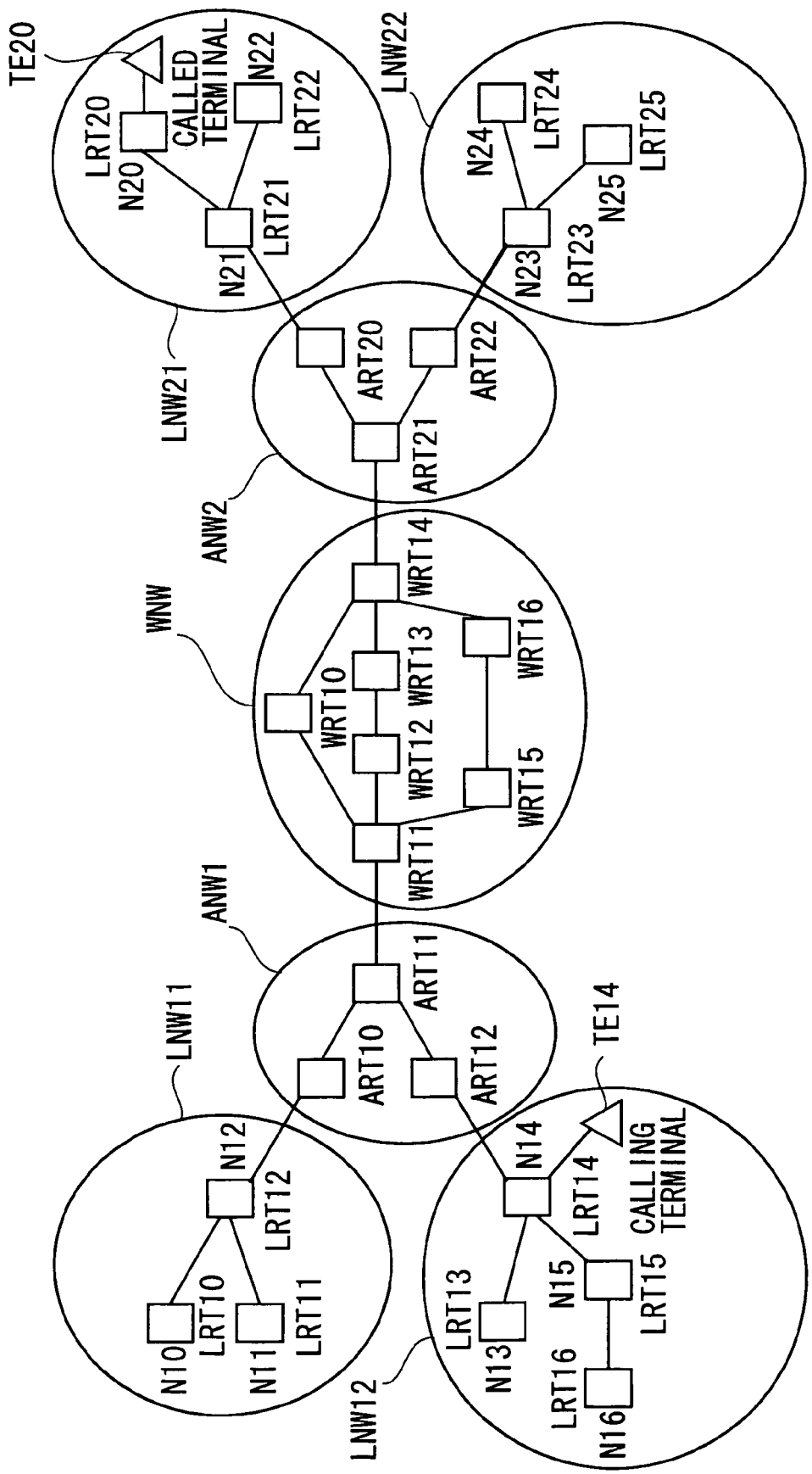
FIG. 27 is a diagram for explaining a structure and fourth and fifth operation examples of a communication network system according to an embodiment of the present invention.

More specifically, in a system structure shown in FIG. 27, the following communication route is adopted. In short, terminals and routers are connected in the following order: the calling terminal TE14 the local router LRT14 the area network ANW1 (the area router ART12 the area router ART11) the wide network WNW (parameter routing in the wide network WNW is based on system setting in the wide network WNW) the area network ANW2 (the area router ART21 the area router ART20) the local network LNW21 (the local router LRT21 the local router LRT20) the called terminal TE20.

Note that control of operations described here is carried out by the control units 113, 213, and 314 in the respective local routers LRTs and the area router ART12 in cooperation with the elements such as the routing table creation units 115 and 215 and the header analysis units 117, 216, and 319. However, explanations of the elements will be omitted unless any specific limitation on the elements is required.

In the local network LNW12, the calling terminal TE14 performs an outgoing call request by transmitting, outgoing call information to the local router LRT14. The outgoing call information transmitted from the calling terminal TE14 has contents shown in FIGS. 11 and 12 as in the above-mentioned first operation example.

In the local router LRT14, the header analysis unit 117 confirms contents of the additional information flag (ON="1" or OFF="0") included in the outgoing call information from the calling terminal TE14. When the contents of the additional information flag is "1" indicating that there is additional information, the control unit 113 transfers the outgoing call information to the next route indicated by the additional information.

In addition, when the contents of the additional information flag is "0" indicating that there is no additional information, the control unit 113 judges how the received outgoing call information should be processed with reference to the slim routing table 112 of the local router LRT14 shown in FIG. 28. The control unit 113 confirms a network (sub-network) indicated by a destination IP address of an IP header in the header portion of the outgoing call information and confirms whether the network belongs to slim routing table 112 as a destination.

In this example, since there is no additional information in the outgoing call information, in the local router LRT14, the control unit 113 performs routing processing with reference to the slim routing table 112. In the local router LRT14, when the slim routing table 112 is referred to, the destination "N20" is not present in the table 112.

Therefore, the control unit 113 transmits the outgoing call information to the routing destination "area router ART12" indicated by the destination "others" in the slim routing table 112. At that point, in the local router LRT14, the control unit 13 stores the route "local router LRT14", through which the outgoing call information is transmitted, in the route addition information area in the header portion of the outgoing call information as route addition information.

In the area router ART12 in the area network ANW1, the control unit 213 judges how the outgoing call information received from the local router LRT14 should be processed with reference to the area routing table 212 held by the area router ART12 itself shown in FIG. 29.

In the area router ART12, first, the control unit 113 confirms a network indicated by the destination IP address of the IP header in the header portion of the outgoing call information and confirms whether there is a corresponding routing destination in the area routing table 212. When there is no corresponding routing destination, the control unit 113 transfers the outgoing call information to a route to the wide router WRT corresponding to a routing destination indicated by the destination "others".

In this example, since the destination is "N20", there is no corresponding routing destination, and the control unit 113 transfers the outgoing call information to the area router ART11 corresponding to the route to the wide router WRT indicated by the destination "others". In transferring the outgoing call information, the area router ART12 deletes route information included in the outgoing call information according to the function of the route information deletion unit 2176 of the header management unit 217 and transfers the outgoing call information to the area router ART11.

The area router ART 11 receives the outgoing call information from the area router ART12. In the area router ART 11, the control unit 213 confirms a network indicated by the destination IP address of the outgoing call information and confirms whether there is a corresponding routing destination in the area routing table 212 shown in FIG. 30. When there is no corresponding routing destination, the control unit 213 transfers the outgoing call information to the route to the wide router WRT corresponding to the routing destination indicated by the destination "others". In this example, since there is no corresponding routing destination, the outgoing call information is transferred to the wide router WRT11.

Figure 31:
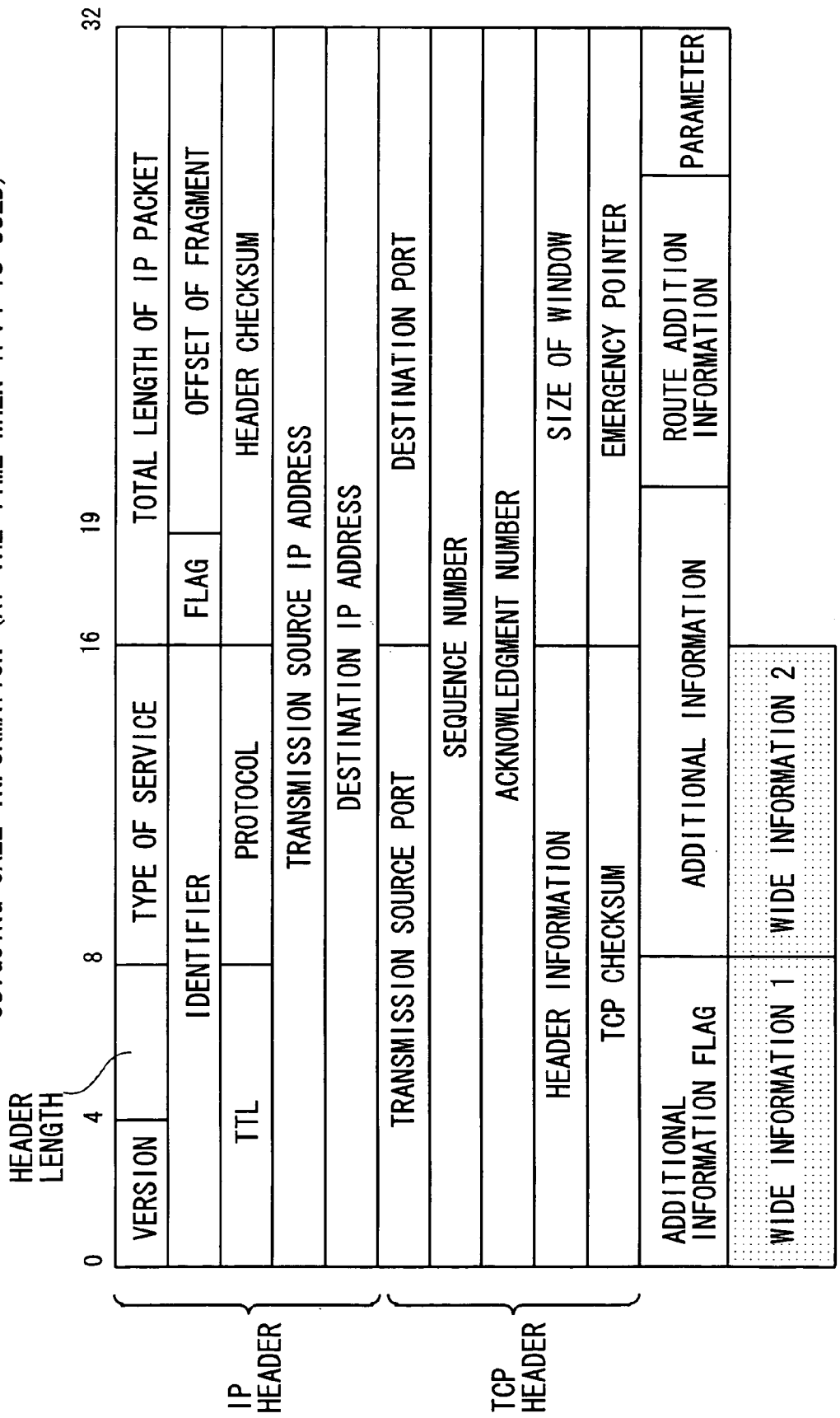
FIG. 31 shows a format of outgoing call information in the fourth operation example.
Figure 41:
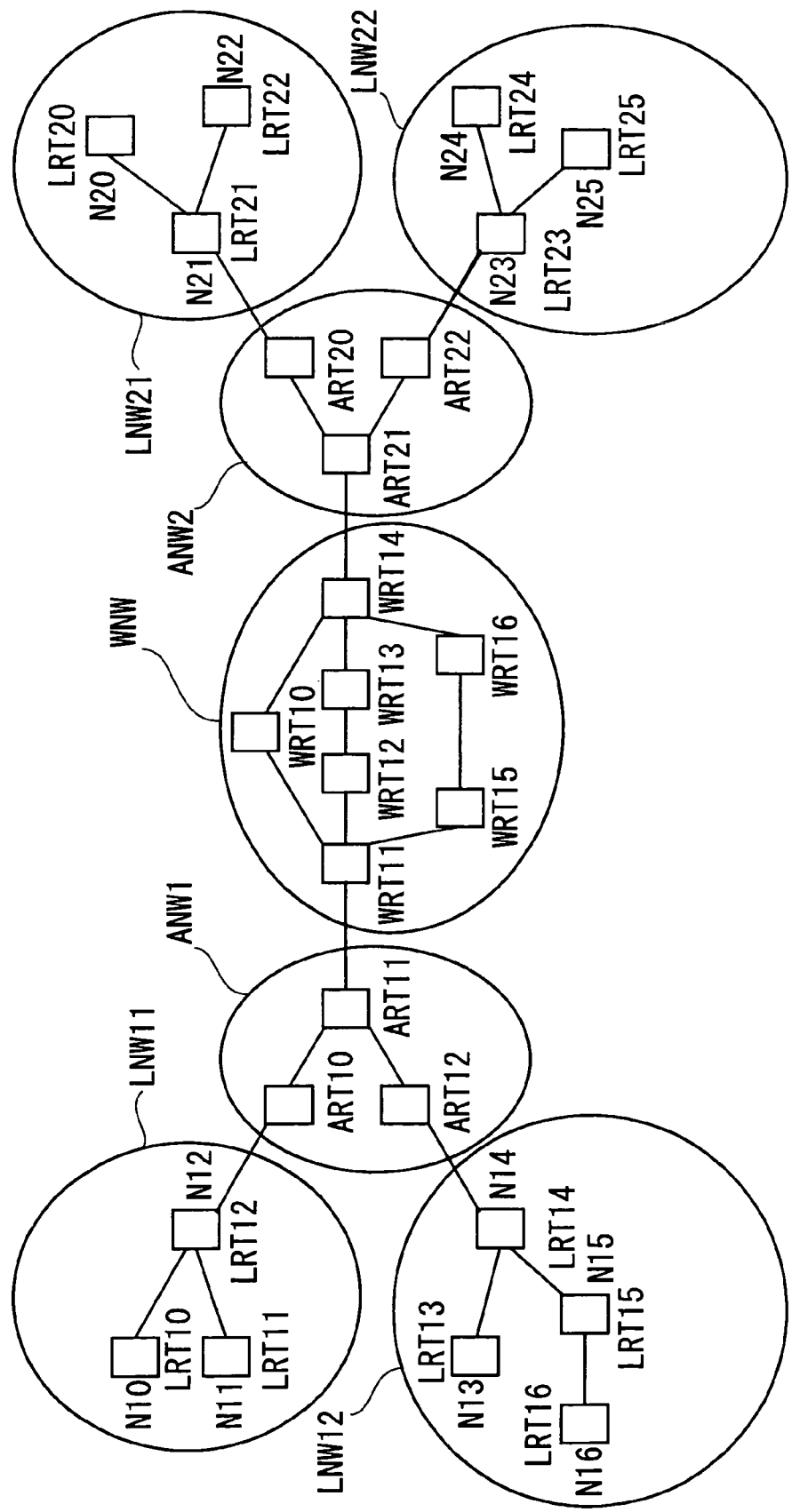
FIG. 41 is a diagram for explaining a structure and a sixth operation example of a communication network system according to an embodiment of the present invention.

In the wide router WRT11 in the wide network WNW, when the outgoing call information is received, first, the control unit 314 confirms whether there is wide information indicating a route in the wide network WNW. Note that FIGS. 31 and 32 show formats of outgoing call information applicable to the protocol IPv4 and the protocol IPv6 to which wide information is added.

In the wide router WRT11 having received the outgoing information, as a result of confirming wide information in a free-use area in the header portion, when there is wide information, the control unit 314 transfers the outgoing call information to the next route in accordance with contents of the wide information. When there is no wide information, the control unit 314 confirms whether parameters are included in the outgoing call information.

When parameters are included in the outgoing call information, the control unit 314 creates the wide routing table 313 corresponding to the parameters of the outgoing call information in accordance with contents (e.g., line speed, the number of hops, and security level) designated by the parameters in cooperation with the routing table creation unit 318.

In this example, since there is no wide information in the outgoing call information received by the wide router WRT11, in the wide router WRT11, the control unit 314 performs confirmation of the parameters of the outgoing call information. As a result, since there is no parameter either, in the wide router WRT11, the control unit 314 searches for a route leading to the destination "N20" with reference to the wide routing table 313 shown in FIG. 33. Here, the parameter of the wide network WNW is subjected to system setting (default setting) in advance as "1: line speed" among "1: line speed, 2: the number of hops, and 3: security level".

FIG. 34 shows an example of the parameter table 312 in the wide router WRT11. As a total parameter value of each section (each section between wide routers WRTs) is lower, the section is adopted as a more preferential route. For example, when a route is from the wide router WRT11 to the wide router WRT14, there are the three routes R1, R2, and R3 described above.

Route R1: Wide router WRT11 Wide router WRT10 Wide router WRT14

Route R2: Wide router WRT11 Wide router WRT12 Wide router WRT13 Wide router WRT14

Route R3: Wide router WRT11 Wide router WRT15 Wide router WRT16 Wide router WRT14

In this case, respective total parameter values are as described below when routes are deduced from the line speed as a parameter.

Route R1: Wide router WRT11 Wide router WRT10 Wide router WRT14
=Total parameter value: 4+4=8

Route R2: Wide router WRT11 Wide router WRT12 Wide router WRT13 Wide router WRT14
=Total parameter value: 2+2+2=6

Route R3: Wide router WRT11 Wide router WRT15 Wide router WRT16 Wide router WRT14
=Total parameter value: 3+3+3=9

As a result, the route R2, in which the total parameter value (line speed) has a minimum value "6", is adopted.

Note that, as another example, when it is assumed that the number of hops is used as a parameter, the respective total parameter values are as described below.

Route R1: Wide router WRT11 Wide router WRT10 Wide router WRT14
=Total parameter value: 1+1=2

Route R2: Wide router WRT11 Wide router WRT12 Wide router WRT13 Wide router WRT14
=Total parameter value: 1+1+1=3

Route R3: Wide router WRT11 Wide router WRT15 Wide router WRT16 Wide router WRT14
=Total parameter value: 1+1+1=3

As a result, the route R1, in which the total parameter value (number of hops) has a minimum value "2", is adopted.

In the wide router WRT11, as a result of searching the wide routing table 313 (FIG. 33) for a route for the destination "N20", the control unit 314 confirms that the routing destination is the "wide router WRT12", the wide information 1 is the "wide router WRT13", and the wide information 2 is the "wide router WRT14".

In this example, first, the wide router WRT11 stores the wide information 1 "wide router WRT13" and the wide information 2 "wide router WRT14" with respect to the outgoing call information of the protocol IPv4 (FIG. 31) or the protocol IPv6 (FIG. 32). Next, the wide router WRT11 transfers the outgoing call information to the wide router WRT12 that is a routing destination.

In the wide router WRT12 having received the outgoing call information from the wide router WRT11, the control unit 314 confirms whether wide information (wide information 1 and 2) is included in the outgoing call information. In this case, since the wide information 1 "wide router WRT13" is included in the outgoing call information, the wide router WRT12 transfers the outgoing call information to the wide router WRT13 in the next stage (next hop). At this point, the wide information deletion unit 321 of the wide router WRT12 deletes the wide information 1 "wide router WRT13" from the header portion of the outgoing call information.

In the wide router WRT13 having received the outgoing call information from the wide router WRT12, the control unit 314 confirms whether wide information is included in the outgoing call information. In this case, since the wide information 2 "wide router WRT14" is included in the outgoing call information, the wide router WRT13 transfers the outgoing call information to the wide router WRT14 in the next stage. At this point, the wide information deletion unit 321 of the wide router WRT13 deletes the wide information 2 "wide router WRT14" from the header portion of the outgoing call information.

In the wide router WRT14 having received the outgoing call information from the wide router WRT13, the control unit 314 also confirms whether wide information is included in the outgoing call information. In this case, since wide information is not included in the outgoing call information, in the wide router WRT14, the control unit 314 confirms a destination indicated by the destination IP address of the IP header with reference to the wide routing table 313 shown in FIG. 35. When the destination is the area router ART under the control of its own router, the wide router WRT14 transfers the outgoing call information to the area router ART. Here, since the destination of the outgoing call information is "N20", the wide router WRT14 applies routing processing to the area router ART21.

In the area router ART21 in the area network ANW2, the control unit 213 subjects the outgoing call information received from the wide router WRT14 to routing processing with reference to the area routing table 212 held by the area router ART21 itself and shown in FIG. 36. In the area router ART21, first, the control unit 213 confirms a destination (network) indicated by the destination IP address of the IP header in the header portion of the outgoing call information and confirms whether there is a corresponding routing destination in the area routing table 212.

In this example, the destination IP address of the IP header is the destination "N20" and the routing destination is the "area router ART20". Therefore, the area router ART21 transfers the received outgoing call information to the area router ART20.

In the area router ART20, the control unit 213 processes the outgoing call information received from the area router ART12 with reference to the area routing table 212 held by the area router ART20 itself and shown in FIG. 37. In the area router ART20, first, the control unit 213 confirms a destination (network) indicated by the destination IP address of the IP header in the header portion of the outgoing call information and confirms whether there is a corresponding routing destination in the area routing table 212.

In this example, since the destination IP address of the IP header is the destination "N20" and the routing destination is the "local router LRT21", the area router ART20 transfers the received outgoing call information to the local router LRT21.

At this point, for the called terminal TE20, the area router ART20 adds an additional information flag and additional information to the header portion of the outgoing call information with the first route creation unit 2171 of the header management unit 217. Here, the additional information flag is "0" and the additional information is the "local router LRT20".

Note that, concerning the additional information flag, an additional information flag "1" is set in the case of the third operation example described-above (the communication form for routing in the local network LNW according to a reconnection request from the area network ANW to the local network LNW). In all other cases, an additional information flag "0" is set.

In the local router LRT21 in the local network LNW21, the control unit 113 processes the outgoing call information received from the area router ART20 with reference to the slim routing table 112 held by the local router LRT21 itself. In the local router LRT21, first, the control unit 113 confirms the destination IP address of the IP header in the header portion of the outgoing call information with the slim routing table 112 and confirms whether the outgoing call information is addressed to the local router LRT21 itself, that is, the terminal TE included in the local router LRT21. If the destination is the terminal TE included in the local router LRT21, the control unit transmits the outgoing call information to a destination port corresponding to the destination IP address.

In addition, when the destination is not the local router LRT21 itself, the local router LRT21 confirms whether there is additional information in the header portion of the outgoing call information and, when there is additional information, transfers the outgoing call information to a destination indicated by the additional information. When there is no additional information, the local router LRT21 performs routing processing according to the slim routing table 213. In this example, since there is the "local router LRT20" as additional information, the local router LRT21 transfers the outgoing call information to the local router LRT20.

In the local router LRT20, the control unit 113 processes the outgoing call information received from the local router LRT21 with reference to the slim routing table 112 held by the local router LRT20 itself and shown in FIG. 39. First, the control unit 113 confirms the destination IP address of the IP header in the header portion of the outgoing call information according to the area routing table 112. Since the destination "N20" corresponds to the terminal TE20 included in the local router LRT20 itself, in the local router LRT20, the control unit 113 transmits the outgoing call information to a destination port corresponding to the destination IP address of the received outgoing call information.

In the local network LNW12, the local router LRT14 including the calling terminal TE14 transmits a communication possible message to the calling terminal TE14 after the time decided in advance elapses. The calling terminal TE14 having received the communication possible message starts data (data packet) transmission. Like the outgoing call information, the data packet is transferred in an order of the calling terminal TE14 the local router LRT14 the area network ANW1 (the area router ART12 the area router ART11) the wide network WNW (parameter routing is based on system setting) the area network ANW2 (the area router ART21 the area router ART20) the local network LNW21 (the local router LRT21 the local router LRT20) the called terminal TE20.

[Fifth Operation Example]

A fifth operation example in the communication network system NNS described above will be explained with reference to FIGS. 2 to 12 and FIGS. 27 to 40.

The fifth operation example corresponds to a case in which a communication form for performing routing in the wide network WNK on the basis of a parameter (number of hops) request from the calling terminal TE14 is adopted, and a communication route is the calling terminal TE14 the local router LRT14 the area network ANW1 the wide network WNW the area network ANW2 the local router LRT21 the local router LRT20 the called terminal TE20.

More specifically, in a system structure shown in FIG. 27, the following communication route is adopted. In short, terminals and routers are connected in the following order: the calling terminal TE14 the local router LRT14 the area network ANW1 (the area router ART12 the area router ART11) the wide network WNW (parameter routing in the wide network WNW is based on system information additionally set in the outgoing call information from the calling terminal TE14) the area network ANW2 (the area router ART21 the area router ART20) the local network LNW21 (the local router LRT21 the local router LRT20) the called terminal TE20.

Note that control of operations described here is carried out by the control units 113, 213, and 314 in the respective local routers LRTs and the area router ART12 in cooperation with the elements such as the routing table creation units 115 and 215 and the header analysis units 117, 216, and 319. However, explanations of the elements will be omitted unless any specific limitation on the elements is required.

In the local network LNW12, the calling terminal TE14 performs an outgoing call request by transmitting the outgoing call information to the local router LRT14. At this point, concerning routing processing in the wide network WNW, the calling terminal TE14 requests the system side to minimize the number of hops. Therefore, the calling terminal TE14 stores the parameter "the number of hops" in the free-use area in the header portion of the outgoing call information and, then, transmits the outgoing call information to the local router LRT14. The outgoing call information transmitted from the calling terminal TE14 has the contents shown in FIGS. 11 and 12 as in the first operation example described above.

In the local router LRT14, the header analysis unit 117 confirms contents of the additional information flag (ON="1" or OFF="0") included in the outgoing call information from the calling terminal TE14. When the contents of the additional information flag is "1" indicating that there is additional information, the control unit 113 transfers the outgoing call information to the next route indicated by the additional information.

In addition, when the contents of the additional information flag is "0" indicating that there is no additional information, the control unit 113 judges how the received outgoing call information should be processed with reference to the slim routing table 112 of the local router LRT14 shown in FIG. 28. The control unit 113 confirms a network (sub-network) indicated by a destination IP address of an IP header in the header portion of the outgoing call information and confirms whether the network belongs to slim routing table 112 as a destination.

In this example, since there is no additional information in the outgoing call information, in the local router LRT14, the control unit 113 performs routing processing with reference to the slim routing table 112. In the local router LRT14, when the slim routing table 112 is referred to, the destination "N20" is not present in the table 112.

Therefore, the control unit 113 transmits the outgoing call information to the routing destination "area router ART12" indicated by the destination "others" in the slim routing table 112. At that point, in the local router LRT14, the control unit 13 stores the route "local router LRT14", through which the outgoing call information is transmitted, in the route addition information area in the header portion of the outgoing call information as route addition information.

In the area router ART12 in the area network ANW1, the control unit 213 judges how the outgoing call information received from the local router LRT14 should be processed with reference to the area routing table 212 held by the area router ART12 itself shown in FIG. 29.

In the area router ART12, first, the control unit 113 confirms a network indicated by the destination IP address of the IP header in the header portion of the outgoing call information and confirms whether there is a corresponding routing destination in the area routing table 212. When there is no corresponding routing destination, the control unit 113 transfers the outgoing call information to a route to the wide router WRT corresponding to a routing destination indicated by the destination "others".

In this example, since the destination is "N20", there is no corresponding routing destination, and the control unit 113 transfers the outgoing call information to the area router ART11 corresponding to the route to the wide router WRT indicated by the destination "others". In transferring the outgoing call information, the area router ART12 deletes route information included in the outgoing call information according to the function of the route information deletion unit 2176 of the header management unit 217 and transfers the outgoing call information to the area router ART11.

The area router ART 11 receives the outgoing call information from the area router ART12. In the area router ART 11, the control unit 213 confirms a network indicated by the destination IP address of the outgoing call information and confirms whether there is a corresponding routing destination in the area routing table 212 shown in FIG. 30. When there is no corresponding routing destination, the control unit 213 transfers the outgoing call information to the route to the wide router WRT corresponding to the routing destination indicated by the destination "others". In this example, since there is no corresponding routing destination, the outgoing call information is transferred to the wide router WRT11.

In the wide router WRT11 in the wide network WNW, when the outgoing call information is received, first, the control unit 314 confirms whether there is wide information indicating a route in the wide network WNW. Note that FIGS. 31 and 32 show formats of outgoing call information applicable to the protocol IPv4 and the protocol IPv6 to which wide information is added.

In the wide router WRT11 having received the outgoing information, as a result of confirming wide information in a free-use area in the header portion, when there is wide information, the control unit 314 transfers the outgoing call information to the next route in accordance with contents of the wide information. When there is no wide information, the control unit 314 confirms whether parameters are included in the outgoing call information.

When the wide information is not included but parameters are included in the outgoing call information, the control unit 314 creates the wide routing table 313 corresponding to the parameters of the outgoing call information in accordance with contents (e.g., line speed, the number of hops, and security level) designated by the parameters.

In this example, since there is no wide information in the outgoing call information received by the wide router WRT11, in the wide router WRT11, the control unit 314 confirms presence or absence of parameters of the outgoing call information. As a result, since the parameter "the number of hops" is present in the outgoing call information, in the wide router WRT11, the control unit 314 finds whether "2: the number of hops" is set in a route leading to the destination "N20" as a parameter with reference to the wide routing table 313 shown in FIG. 33.

Here, since a parameter of the wide network WNW is subjected to system setting (default setting) uniformly as "1: line speed" among "1: line speed, 2: the number of hops, and 3: security level" in advance, "2: the number of hops" is not present in the wide routing table 313 as a parameter for the destination "N20". Thus, in the wide router WRT11, the control unit 314 searches the parameter table 312 shown in FIG. 34 for the most effective route to the destination "N20" and adds the most effective route to the wide routing table 313 shown in FIG. 33.

A procedure of processing for adding the most effective route will be described below. In this example, there are the following three routes from the wide router WRT11 to the wide router WRT14.

Route R1: Wide router WRT11 Wide router WRT10 Wide router WRT14

Route R2: Wide router WRT11 Wide router WRT12 Wide router WRT13 Wide router WRT14

Route R3: Wide router WRT11 Wide router WRT15 Wide router WRT16 Wide router WRT14

Concerning these three routes, the control unit 314 adopts a route in which a total parameter value of the parameter "the number of pops" is minimized, that is, a route in which the number of wide routers on the route is the smallest and adds the route in the wide routing table 313 shown in FIG. 33. Note that, in adding the route, a transfer object wide router in the next stage (the wide router WRT10) writes (stores) a wide router on the route (the wide router WRT14) following the wide router WRT10 as wide information. FIG. 40 shows an example of the wide routing table 313 created after the addition processing.

Note that FIG. 34 shows an example of the parameter table 312 in the wide router WRT11. As a total parameter value of each section (each section between wide routers WRTs) is lower, the section is adopted as a more preferential route. For example, when a route is from the wide router WRT11 to the wide router WRT14, there are the three routes R1, R2, and R3 described above.

In this case, respective total parameter values are as described below when routes are deduced from the line speed as a parameter.

Route R1: Wide router WRT11 Wide router WRT10 Wide router WRT14
=Total parameter value: 4+4=8

Route R2: Wide router WRT11 Wide router WRT12 Wide router WRT13 Wide router WRT14
=Total parameter value: 2+2+2=6

Route R3: Wide router WRT11 Wide router WRT15 Wide router WRT16 Wide router WRT14
=Total parameter value: 3+3+3=9

As a result, the route R2, in which the total parameter value (line speed) has a minimum value "6", is adopted.

In addition, as another example, when it is assumed that the number of hops is a parameter, the respective total parameter values are as described below.

Route R1: Wide router WRT11 Wide router WRT10 Wide router WRT14
=Total parameter value: 1+1=2

Route R2: Wide router WRT11 Wide router WRT12 Wide router WRT13 Wide router WRT14
=Total parameter value: 1+1+1=3

Route R3: Wide router WRT11 Wide router WRT15 Wide router WRT16 Wide router WRT14
=Total parameter value: 1+1+1=3

As a result, the route R1, in which the total parameter value (number of hops) has a minimum value "2", is adopted.

In the wide router WRT11, as a result of searching the wide routing table 313 shown in FIG. 40 for a route corresponding to the parameter "2: the number of hops" for the destination "N20", the control unit 314 confirms that the routing destination is the "wide router WRT10", and the wide information 1 is the "wide router WRT14".

In this example, first, the wide router WRT11 stores the wide information 1 "wide router WRT14" with respect to the outgoing call information of the protocol IPv4 (FIG. 31) or the protocol IPv6 (FIG. 32) with reference to the wild routing table 313. Next, the wide router WRT11 transfers the outgoing call information to the wide router WRT10 that is a routing destination.

In the wide router WRT10 having received the outgoing call information from the wide router WRT11, the control unit 314 confirms whether wide information (wide information 1 and 2) is included in the outgoing call information. In this case, since the wide information 1 "wide router WRT14" is included in the outgoing call information, the wide router WRT10 transfers the outgoing call information to the wide router WRT14 in the next stage. At this point, the wide information deletion unit 321 of the wide router WRT10 deletes the wide information 1 "wide router WRT14" from the header portion of the outgoing call information.

In the wide router WRT14 having received the outgoing call information from the wide router WRT10, the control unit 314 confirms whether wide information is included in the outgoing call information. In this case, since wide information is not included in the outgoing call information, in the wide router WRT14, the control unit 314 confirms a destination indicated by the destination IP address of the IP header with reference to the wide routing table 313 shown in FIG. 35. When the destination is the area router ART under the control of its own router, the wide router WRT14 transfers the outgoing call information to the area router ART. Here, since the destination of the outgoing call information is "N20", the wide router WRT14 applies routing processing to the area router ART21.

In the area router ART21 in the area network ANW2, the control unit 213 subjects the outgoing call information received from the wide router WRT14 to routing processing with reference to the area routing table 212 held by the area router ART21 itself and shown in FIG. 36. In the area router ART21, first, the control unit 213 confirms a destination (network) indicated by the destination IP address of the IP header in the header portion of the outgoing call information and confirms whether there is a corresponding routing destination in the area routing table 212.

In this example, the destination IP address of the IP header is the destination "N20" and the routing destination is the "area router ART20". Therefore, the area router ART21 transfers the received outgoing call information to the area router ART20.

In the area router ART20, the control unit 213 processes the outgoing call information received from the area router ART21 with reference to the area routing table 212 held by the area router ART20 itself and shown in FIG. 37. In the area router ART20, first, the control unit 213 confirms a destination (network) indicated by the destination IP address of the IP header in the header portion of the outgoing call information and confirms whether there is a corresponding routing destination in the area routing table 212.

In this example, since the destination IP address of the IP header is the destination "N20" and the routing destination is the "local router LRT21", the area router ART20 transfers the received outgoing call information to the local router LRT21.

At this point, for the called terminal TE20, the area router ART20 adds an additional information flag and additional information to the header portion of the outgoing call information with the first route creation unit 2171 of the header management unit 217. Here, the additional information flag is "0" and the additional information is the "local router LRT20". The outgoing call information added with the additional information flag and the additional information is transmitted by the route transmission unit 2174 of the header management unit 217.

Note that, concerning the additional information flag, in the case of the third operation example described above (the communication form for performing routing in the local network LNW according to a reconnection request from the area network ANW to the local network LNW), an additional information flag "1" is set. In all other cases, an additional information flag "0" is set.

In the local router LRT21 in the local network LNW21, the control unit 113 processes the outgoing call information received from the area router ART20 with reference to the slim routing table 112 held by the local router LRT21 itself and shown in FIG. 38. In the local router LRT21, first, the control unit 113 confirms the destination IP address of the IP header in the header portion of the outgoing call information with the slim routing table 112 and confirms whether the outgoing call information is addressed to the local router LRT21 itself, that is, the terminal TE included in the local router LRT21. If the destination is the terminal TE included in the local router LRT21, the control unit 113 transmits the outgoing call information to a destination port corresponding to the destination IP address.

In addition, when the destination is not the local router LRT21 itself, the local router LRT21 confirms whether there is additional information in the header portion of the outgoing call information and, when there is additional information, transfers the outgoing call information to a destination indicated by the additional information. When there is no additional information, the local router LRT21 performs routing processing according to the slim routing table 213. In this example, since there is the "local router LRT20" as additional information, the local router LRT21 transfers the outgoing call information to the local router LRT20.

In the local router LRT20, the control unit 113 processes the outgoing call information received from the local router LRT21 with reference to the slim routing table 112 held by the local router LRT20 itself and shown in FIG. 39. First, the control unit 113 confirms the destination IP address of the IP header in the header portion of the outgoing call information according to the area routing table 112. Since the destination "N20" corresponds to the terminal TE20 included in the local router LRT20 itself, in the local router LRT20, the control unit 113 transmits the outgoing call information to a destination port corresponding to the destination IP address of the received outgoing call information.

In the local network LNW12, the local router LRT14 including the calling terminal TE14 transmits a communication possible message to the calling terminal TE14 after the time decided in advance elapses. The calling terminal TE14 having received the communication possible message starts data (data packet) transmission. Like the outgoing call information, the data packet is transferred in an order of the calling terminal TE14 the local router LRT14 the area network ANW1 (the area router ART12 the area router ART11) the wide network WNW (parameter routing based on the number of hops) the area network ANW2 (the area router ART21 the area router ART20) the local network LNW21 (the local router LRT21 the local router LRT20) the called terminal TE20.

[Sixth Operation Example]

A sixth operation example in the communication network system NNS described above will be explained with reference to FIGS. 2 to 8 and FIGS. 41 to 47.

In the sixth operation example, exchange of routing information will be explained as a communication form among the local routers LRT13, LRT14, LRT15, and LRT16 in the local network LNW12 and between the local router LRT14 in an edge position of the local network LNW12 and the area router ART12 in an edge position of the area network ANW1 directly connected to the local network LNW12.

Note that control for operations to be described here is carried out by the control units 113 and 213 in the respective local routers LRTs and the area router ART12 in cooperation with the elements such as the routing table creation units 115 and 215 and the header analysis units 117 and 216. However, explanations of the elements will be omitted unless any specific limitation on the elements is required.

<Exchange of Routing Information>

(1) Among the local routers LRTs (LRT13, LRT14, LRT15, and LRT16) in the local network LNW12, each of the local routers LRTs performs exchange of routing information with other local routers LRTs adjacent to each other as described below. In addition, the local router LRT14 and the area router ART12 in the area network ANW1 performs exchange of routing information as described below.

(a) When the local router LRT16 notifies the local router LRT15 of routing information (local router information), in the local router LRT15, the control unit 113 recognizes the local router LRT16.

(b) When the local router LRT15 notifies the local routers LRT16 and LRT14 of local router information, in the local routers LRT16 and LRT14, the control unit 113 recognizes the local router LRT15.

(c) When the local router LRT14 notifies the local routers LRT15 and LRT13, and the area router ART12 of local router information, in the local routers LRT15 and LRT13, the control unit 113 recognizes the local router LRT14. Further, in the area router ART12, the control unit 113 recognizes the local router LRT14.

(d) When the local router LRT13 notifies the local router LRT14 of local router information, in the local router LRT14, the control unit 113 recognizes the local router LRT13.

As a result of the exchange of routing information up to this point, as shown in FIGS. 42 to 46, states of the slim routing table 112 of the respective local routers LRTs and the area routing table 212 of the area router ART12 are as described below.

In the table 112 of the local router LRT16, destinations "N15" and a routing destination "local router LRT15" are set (FIG. 42).

In the table 112 of the local router LRT15, destinations "N16", and "14", and routing destinations "local router LRT16", and "local router LRT14" are set (FIG. 43).

In the table 112 of the local router LRT14, destinations "N15" and "13", and routing destination "local router LRT15", and "local router LRT13" are set (FIG. 44).

In the table 112 of the local router LRT13, a destination "others", and a routing destination "local router LRT14" are set (FIG. 45).

In the table 212 of the area router ART12, destinations "N13", "N14", "N15", and "N16" and a routing destination "local router LRT14" are set (FIG. 46).

(2) The area router ART12 notifies the local router LRT14 to be directly connected to the local network LNW12 of area router information as routing information. The local router LRT14 having received the area router information adds the destination "others" and the routing destination "area router ART12" to the routing table 112 of the local router LRT14 itself and, at the same time, transmits the area router information to the local routers LRT13 and LRT15 corresponding to all exit routes (excluding entrance routes) connected to the local router LRT14.

The local routers LRT13 and LRT15 receive the transmitted area router information. Since there is no rooter further connected to the local router LRT13, the local router LRT13 discards the area router information after the reception. The local router LRT15 transmits the area router information to the local router LRT16 on an exit route (next hop).

The local router LRT16 receives the transmitted area router information. Since there is no exit route (next hop) to follow the local router LRT16, the local router LRT16 discards the area router information.

Consequently, notification of the area router information to all the local routers LRTs in the local network LNW12 is completed. Note that, since it is likely that the area router information is looped depending upon a network shape (e.g., a loop type and a ring type), a call number is attached to area router information, and the call number is checked in the local router LRT that receives the area router information. When area router information overlaps, it is possible to cope with the overlap by discarding the overlapping area router information.

(3) In all the local routers LRTs having received the area router information, the area router information (a route to an area router) is added to the slim routing table 112 according to the function of the routing table creation unit 115.

As a result of the processing of (2) and (3) described above, as shown in FIGS. 42 to 45, the respective slim routing tables 112 of the local router LRT13 to the local router LRT16 are set in the following conditions.

In the table 112 of the local router LRT16, a routing destination "local router LRT15" is additionally set as a route to an area router (FIG. 42).

In the table 112 of the local router LRT15, a routing destination "local router LRT14" is additionally set as a route to an area router (FIG. 43).

In the table 112 of the local router LRT14, a routing destination "local router LRT12" is additionally set as a route to an area router (FIG. 44).

In the table 112 of the local router LRT13, a routing destination "local router LRT14" is additionally set as a route to an area router (FIG. 45).

(4) Next, the respective local routers LRTs transmit the local router information to a route to an area router as routing information. Note that, according to the function of the route addition unit 1161 of the header management unit 116, every time the local router information is transmitted through the respective local routers LRTs, local router information of the local routers LRTs on the route is added to the local router information until the local router information reaches the area router ART12.

Then, the local router information transmitted from the local router LRT13 reaches the area router ART12 as "the local router LRT13 and the local router LRT14".

The local router information transmitted from the local router LRT14 reaches the area router ART12 as "the local router LRT14".

The local router information transmitted from the local router LRT15 reaches the area router ART12 as "the local router LRT15 and the local router LRT14".

The local router information transmitted from the local router LRT16 reaches the area router ART12 as "the local router LRT16, the local router LRT15, and the local router LRT14".

As a result, the area routing table 212 of the area router ART12 is set in a state shown in FIG. 46.

<Addition and Deletion of the Local Router LRT>

Exchange of routing information is performed periodically between the area router ART12 and the respective local routers LRTS. When the local router LRT is additionally registered a new, the new local router LRT transmits routing information to the area router ART12, whereby the local router LRT is added to the area routing table 212 in the area router ART12.

In addition, at the time of deletion of the local router LRT, since routing information corresponding to the local router LRT is not received in the area router ART12, the local router LRT is automatically deleted from the area routing table 212 in the area router ART12. For example, when the local router LRT13 is deleted, a state of the area routing table 212 changes as shown in FIG. 47.

What is claimed is:

1. A communication network system, comprising:
   plural lower hierarchy networks having plural first relay apparatuses that accommodate at least one terminal in a distributed arrangement, respectively, adjacent first relay apparatuses being connected by a line, respectively;
   an intermediate hierarchy network having plural second relay apparatuses, adjacent second relay apparatuses being connected by a line respectively, and connecting the plural lower hierarchy networks via the second relay apparatuses in edge positions to be connected with the first relay apparatuses in respective edge positions in the plural lower hierarchy networks by line; and
   an upper hierarchy network having, when a plurality of the intermediate hierarchy networks are present, plural third relay apparatuses, adjacent third relay apparatuses being connected by a line, and connecting the plural intermediate hierarchy networks via the third relay apparatuses in edge positions that are connected with the second relay apparatuses in the respective edge positions in the plural intermediate hierarchy networks by a line;
   wherein each of the first relay apparatuses in the plural lower hierarchy networks has a first routing table adopting a simple structure by holding routing information limited to routing information corresponding to own first relay apparatus, to routing information on the first relay apparatus coming into an adjacent state through the line and to routing information on the second relay apparatus in the edge position if coming into the adjacent state, first routing tables in the first relay apparatuses hold different routing information from each other;
   each of the second relay apparatuses in the intermediate hierarchy network has a second routing table that holds routing information on the second relay apparatus coming into an adjacent state through the line and routing information on the first relay apparatus in the edge position if coming into the adjacent state, second routing tables in the second relay apparatuses hold different routing information from each-other;
   the second routing table of each of the second relay apparatuses in the plural intermediate hierarchy networks further holds routing information for routing to the third relay apparatus in the edge position; and
   each of the third relay apparatuses in the edge positions in the upper hierarchy network has a third routing table to perform routing processing based on parameters for specifying a priority of a line in each section of the third relay apparatuses in an adjacent state that intervenes between two of the third relay apparatuses in the edge positions.

2. The communication network system according to claim 1, wherein the upper hierarchy network is a backbone network that connects the plural intermediate hierarchy networks through a high-speed line.

3. The communication network system according to claim 1, wherein:
   the plural third relay apparatuses in the upper hierarchy network are connected in a mesh shape through a high-speed line; and
   the plural second relay apparatuses in the intermediate hierarchy networks and the first relay apparatuses in the lower hierarchy networks are connected in a tree structure through a line, respectively.

4. The communication network system according to claim 1, wherein the first, the second and the thrid relay apparatuses are routers.

5. The communication network according to claim 1, wherein each of the first relay apparatuses has a control unit that exchanges information on a physical connection state in the lower hierarchy networks in order to obtain routing information on at least one of the first relay apparatuses and the second relay apparatuses in the edge positions that come into an adjacent state through the line.

6. The communication network system according to claim 1, wherein each of the first relay apparatuses has a route addition unit that, when outgoing call information transmitted from a calling terminal is transferred from the first relay apparatuses to the second relay apparatuses in the edge positions, sequentially adds information on the first relay apparatuses on a route in a route addition information area in a header portion of the received outgoing call information as routing information.

7. The communication network system according to claim 1, wherein each of the first relay apparatuses has a header analysis unit that analyzes contents of a header portion of the outgoing call information transmitted from the terminal, the first relay apparatuses, or the second relay apparatuses in the edge positions in order to perform routing processing that refers to the first routing table.

8. The communication network system according to claim 1, wherein each of the first relay apparatuses has a transmission instruction unit that, when reply information for a re-calling request from the second relay apparatuses in the edge positions is transmitted to a calling terminal and the calling terminal transmits outgoing call information to a called terminal again, sends a transmission instruction request for a data packet to the calling terminal after receiving the re-calling request transmitted from the calling terminal in order to cause the calling terminal to perform communication in one of the lower hierarchy network.

9. The communication network system according to claim 1, wherein each of the first relay apparatuses has a transmission instruction unit that, when predetermined time elapses after a calling terminal transmits outgoing call information to a called terminal, sends a transmission instruction request for a data packet to the calling terminal in order to cause the calling terminal to perform communication outside one of the lower hierarchy network.

10. The communication network system according to claim 1, wherein each of the second relay apparatuses has a control unit that exchanges information on a physical connection state in the plural lower hierarchy networks and the intermediate hierarchy networks in order to obtain at least one of routing information on the second relay apparatuses and the first relay apparatuses in the edge positions that come into an adjacent state through the line and routing information for routing to the third relay apparatuses in the edge positions.

11. The communication network system according to claim 1, wherein each of the second relay apparatuses has a header analysis unit that analyzes contents of a header portion of the outgoing call information transmitted from the terminal, the first relay apparatuses in the edge positions, the second relay apparatuses, or the third relay apparatuses in the edge positions in order to perform routing processing that refers to the second routing table.

12. The communication network system according to claim 1, wherein each of the second relay apparatuses has a first route creation unit that, concerning outgoing call information received from the upper hierarchy network, creates a route to the lower hierarchy networks on a called side.

13. The communication network system according to claim 1, wherein each of the second relay apparatuses has a route check unit that, concerning outgoing call information received from the lower hierarchy networks, judges whether connection in the lower hierarchy networks is possible even without passing the second relay apparatuses.

14. The communication network system according to claim 13, wherein each of the second relay apparatuses has a first route creation unit that, concerning the outgoing call information received from the lower hierarchy networks, when it is possible to make connection in the lower hierarchy networks even without passing the second relay apparatuses as a result of the judgment by the route check unit, creates routing information indicating a route to the lower hierarchy networks on a called terminal side.

15. The communication network system according to claim 14, wherein the first route creation unit adds the created routing information to an additional information area of the header portion of the outgoing call information as additional information.

16. The communication network system according to claim 15, wherein, when the created routing information is added to the header portion of the outgoing call information as additional information, the first route creation unit also adds an additional information flag that indicates whether additional information received in a called terminal should be referred to in an opposite route at the time of reply from the called terminal to a calling terminal.

17. The communication network system according to claim 13, wherein each of the second relay apparatuses has a second route creation unit that, concerning the outgoing call information received from the lower hierarchy networks, when it is possible to make connection in the lower hierarchy networks even without passing the second relay apparatuses as a result of the judgment by the route check unit, creates routing information in the lower hierarchy networks from a calling terminal to a called terminal.

18. The communication network system according to claim 17, wherein the second route creation unit sets the created routing information in the lower hierarchy networks in the header portion of the reply information.

19. The communication network system according to claim 18, wherein, when the second route creation unit sets the created routing information in the lower hierarchy networks in the header portion of the reply information, the second route creation unit also sets flag information.

20. The communication network system according to claim 16, wherein each of the second relay apparatuses has a route transmission unit that transmits the outgoing call information, to which the additional information flag and the additional information are added by the first route creation unit, to the lower hierarchy networks.

21. The communication network system according to claim 19, wherein each of the second relay apparatuses has a route transmission unit that transmits the reply information, to which the routing information in the lower hierarchy network and the flag information are added by the second route creation unit, to the lower hierarchy networks.

22. The communication network system according to claim 1, wherein each of the second relay apparatuses has a route read unit that reads routing information included in a route addition information area in a header portion of the outgoing call information received from the lower hierarchy networks.

23. The communication network system according to claim 22, wherein each of the second relay apparatuses has a route deletion unit that, after reading the routing information included in the route addition information area of the outgoing call information with the route read unit, deletes the routing information in the route addition information area.

24. The communication network system according to claim 1, wherein each of the third relay apparatuses has a parameter table for managing the parameters of the line in each section of the third relay apparatuses in the adjacent state.

25. The communication network system according to claim 1, wherein the parameters include at least one of a line bandwidth, the number of hops, a charge, security level, and convergence/failure states.

26. The communication network system according to claim 24, wherein each of the third relay apparatuses has a control unit that exchanges information on the parameters with the third relay apparatuses in the adjacent state in order to create the parameter table.

27. The communication network system according to claim 26, wherein each of the third relay apparatuses has local parameter data that manages the parameters held by the third relay apparatus individually.

28. The communication network system according to claim 27, wherein each of the third relay apparatuses has a parameter table creation unit that exchanges information on the local parameter data among the third relay apparatuses in the adjacent state using the control unit and creates the parameter table.

29. The communication network system according to claim 28, wherein each of the third relay apparatuses has a routing table creation unit that creates the third routing table on the basis of the parameter table.

30. The communication network system according to claim 1, wherein each of the third relay apparatuses has a control unit that controls to set according to which of the parameters routing processing should be performed in the upper hierarchy networks, as a default setting in advance.

31. The communication network system according to claim 1, wherein each of the third relay apparatuses has a control unit that controls to set according to which of the parameters routing processing should be performed in the upper hierarchy network in response to a parameter request included in the outgoing call information from the terminal.

32. The communication network system according to claim 1, wherein each of the third relay apparatuses has a header analysis unit that analyzes a header portion of received outgoing call information in order to perform routing processing with reference to the third routing table.

33. The communication network system according to claim 1, wherein each of the third relay apparatuses has a control unit that, when outgoing call information is received from the third relay apparatuses in the adjacent state, confirms presence or absence of routing information corresponding to the third relay apparatuses on a route in the upper hierarchy network and, when this routing information is present, transfers the outgoing call information to the designated third relay apparatus in the next stage.

34. The communication network system according to claim 1, wherein each of the third relay apparatuses has a header addition unit that, as a result of performing routing processing that refers to the third routing table, when there is routing information corresponding to the third relay apparatuses on a route in the upper hierarchy network, adds this routing information to a header portion of the outgoing call information.

35. The communication network system according to claim 31, wherein the control unit of each of the third relay apparatuses performs routing processing according to the parameters of the default setting when the parameter request is absent in the outgoing call information.

36. The communication network system according to claim 31, wherein the control unit of each of the third relay apparatuses performs routing processing according to the parameters of the default setting when the parameter request is present in the outgoing call information and contents corresponding to this parameter request are in the default setting.

37. The communication network system according to claim 31, wherein, when the parameter request is present in the outgoing call information and contents corresponding to this parameter request are not in the default setting, concerning the parameters requested by the terminal, the control unit of each of the third relay apparatuses obtains an optimum route from a parameter table for managing the parameters of the line in each section of the third relay apparatuses in the adjacent state and additionally sets the obtained optimum route in the third routing table to perform routing processing.

38. The communication network system according to claim 1, wherein each of the third relay apparatuses has a deletion unit that, in the case where the third relay apparatus receives the outgoing call information including routing information applicable to the third relay apparatuses on a route in the upper hierarchy networks, deletes routing information addressed to the third relay apparatus when the third relay apparatus transfers the outgoing call information to the third relay apparatus in the next stage indicated by this routing information.

* * * * *

UNITED STATES PATENT AND TRADEMARK OFFICE
CERTIFICATE OF CORRECTION

PATENT NO. : 7,551,634 B2
APPLICATION NO. : 11/024418
DATED : June 23, 2009
INVENTOR(S) : Takehiro Nabae It is certified that error appears in the above-identified patent and that said Letters Patent is hereby corrected as shown below:

Column 37, Line 41, change "line;" to --a line;--.

Column 37, Line 67, change "each-other;" to --each other;--.

Column 38, Line 26, change "thrid" to --third--.

Column 38, Line 42, change "of the" to --of--.

Column 38, Line 61, change "network." to --networks.--.

Column 39, Line 3, change "network." to --networks.--.

Column 39, Line 16, change "of the" to --of--.

Column 39, Line 67, change "of the" to --of--.

Column 40, Line 21, change "of the" to --of--.

Column 40, Line 62, change "networks," to --network,--.

Column 41, Line 2, change "in the" to --in--.

Column 41, Line 23, change "of the" to --of--.

Column 42, Line 20, change "the outgoing" to --outgoing--.

Column 42, Line 22, change "networks," to --network,--.

UNITED STATES PATENT AND TRADEMARK OFFICE
CERTIFICATE OF CORRECTION

PATENT NO.        : 7,551,634 B2
APPLICATION NO.   : 11/024418
DATED             : June 23, 2009
INVENTOR(S)       : Takehiro Nabae It is certified that error appears in the above-identified patent and that said Letters Patent is hereby corrected as shown below:

Column 42, Line 25, change "in the" to --in--.

Signed and Sealed this

Third Day of November, 2009

David J. Kappos
*Director of the United States Patent and Trademark Office*